(12) United States Patent
Laitinen et al.

(10) Patent No.: US 11,457,310 B2
(45) Date of Patent: Sep. 27, 2022

(54) APPARATUS, METHOD AND COMPUTER PROGRAM FOR AUDIO SIGNAL PROCESSING

(71) Applicant: Nokia Technologies Oy, Espoo (FI)

(72) Inventors: Mikko-Ville Laitinen, Espoo (FI); Juha Vilkamo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/053,095

(22) PCT Filed: May 7, 2019

(86) PCT No.: PCT/FI2019/050356
§ 371 (c)(1),
(2) Date: Nov. 5, 2020

(87) PCT Pub. No.: WO2019/215391
PCT Pub. Date: Nov. 14, 2019

(65) Prior Publication Data
US 2021/0076130 A1    Mar. 11, 2021

(30) Foreign Application Priority Data
May 9, 2018  (GB) ..................................... 1807537

(51) Int. Cl.
*H04R 3/00* (2006.01)
*G10L 25/18* (2013.01)
(Continued)

(52) U.S. Cl.
CPC .............. *H04R 3/005* (2013.01); *G10L 25/18* (2013.01); *G10L 25/21* (2013.01); *H04R 1/406* (2013.01)

(58) Field of Classification Search
CPC ......... H04N 21/2143; H04N 21/23418; H04N 21/23424; H04N 21/2547;
(Continued)

(56) References Cited

U.S. PATENT DOCUMENTS 9,794,720 B1    10/2017  Kadri ................................. 29/2
10,820,097 B2 * 10/2020  Tsingos ................... G10L 25/18
(Continued)

FOREIGN PATENT DOCUMENTS

CN    103621110 A    3/2014
JP    2007006253 A    1/2007
(Continued)

OTHER PUBLICATIONS

3GPP TSG-SA4#98 meeting, Apr. 9-13, 2018, Kista, Sweden, Tdoc S4 (18)0462, "On spatial metadata for IVAS spatial audio input format", Nokia Corporation, 7 pgs.

*Primary Examiner* — Lun-See Lao
(74) *Attorney, Agent, or Firm* — Harrington & Smith

(57) ABSTRACT

Examples of the disclosure relate to apparatus, electronic devices, methods and computer programs. The apparatus are configured to obtain at least a first audio signal and a second audio signal wherein the first audio signal and the second audio signal are captured by a microphone array including at least two microphones. The apparatus are also configured to identify at least a first direction and at least a second direction. The first and second directions are identified for a plurality of frequency bands. The first direction and the second direction are identified by using delay parameters between at least the first audio signal and the second audio signal.

20 Claims, 10 Drawing Sheets

(51) Int. Cl.
  *G10L 25/21* (2013.01)
  *H04R 1/40* (2006.01)
(58) Field of Classification Search
  CPC ......... H04N 21/25891; H04N 21/2668; H04N 21/41415; H04N 21/4331; H04N 21/44008; H04N 21/44016; H04N 21/458; H04N 21/812; H04N 21/8352; H04N 21/84; H04N 21/8405; H04N 21/8456; H04N 7/088; H04N 7/0887; H04N 7/162; H04N 21/235; H04N 21/433; H04N 21/435; H04N 21/4755; H04N 21/6112; H04N 21/6125; H04N 5/76; H04N 7/16; H04R 2499/11; H04R 3/005; H04R 2201/40; H04R 2410/01; H04R 2430/25; H04R 2499/15; H04R 1/40; H04R 1/406; H04R 3/00; H04H 20/10; H04H 20/14; H04H 60/59; G10L 25/18; G10L 19/008; G10L 25/21; G10L 25/45; G10L 25/51; H04B 1/40; H04M 1/2535; H04M 1/6033; H04M 3/323; H04M 7/006; H04S 1/00; H04S 7/00

USPC .................................. 381/92, 56–58; 700/94
See application file for complete search history.

(56) References Cited

U.S. PATENT DOCUMENTS

| 2012/0182429 | A1* | 7/2012 | Forutanpour | H04R 3/005 |
| | | | | 348/175 |
| 2015/0124980 | A1 | 5/2015 | Vilermo et al. | 1/8 |
| 2016/0105416 | A1 | 4/2016 | L'Heureux et al. | 381/92 |
| 2018/0166062 | A1* | 6/2018 | Hoffberg | G10K 15/04 |
| 2019/0230436 | A1* | 7/2019 | Tsingos | H04R 3/005 |

FOREIGN PATENT DOCUMENTS

| WO | WO-2017/129239 A1 | 8/2017 | |
| WO | WO-2017/143003 A1 | 8/2017 | |
| WO | WO 2018/060550 * | 4/2018 | ........... G10L 19/008 |
| WO | WO 2018/060550 A1 | 4/2018 | |
| WO | WO 2018/064296 A1 | 4/2018 | |

\* cited by examiner

APPARATUS, METHOD AND COMPUTER PROGRAM FOR AUDIO SIGNAL PROCESSING

CROSS REFERENCE TO RELATED APPLICATION

This patent application is a U.S. National Stage application of International Patent Application Number PCT/FI2019/050356 filed May 7, 2019, which is hereby incorporated by reference in its entirety, and claims priority to GB 1807537.4 filed May 9, 2018.

TECHNOLOGICAL FIELD

Examples of the disclosure relate to an apparatus, method and computer program for audio signal processing. The apparatus, method and computer program may be configured to process spatial audio signals.

BACKGROUND

When audio signals are captured by two or more microphones the audio signals may be processed to obtain the spatial information from the audio signals. This may include information about the direction from which sound arrives relative to the microphones. The spatial information may be used to enable the audio signals to be rendered to provide a realistic spatial audio experience for a user.

BRIEF SUMMARY

According to various, but not necessarily all, examples of the disclosure there is provided an apparatus comprising: processing circuitry; and memory circuitry including computer program code, the memory circuitry and the computer program code configured to, with the processing circuitry, cause the apparatus to: obtain at least a first audio signal and a second audio signal wherein the first audio signal and the second audio signal are captured by a microphone array comprising at least two microphones; identify, for a plurality of frequency bands, at least a first direction; and identify, for a plurality of frequency bands, at least a second direction; wherein the first direction and the second direction are identified by using delay parameters between at least the first audio signal and the second audio signal.

The memory circuitry and the computer program code may be configured to, with the processing circuitry, cause the apparatus to identify a first energy parameter and identify a second energy parameter.

The energy parameter may comprise a ratio.

The directions and the energy parameters may be determined for each frequency band.

Different frequency bands may be used to identify the second direction and/or second energy parameter than the first direction and/or first energy parameter.

Wider frequency bands may be used to identify the second direction and/or second energy parameter than are used to identify the first direction and/or first energy parameter.

The first direction may correspond to a first direction of arrival for sound and the second direction may correspond to a second direction of arrival for sound.

The first audio signal and the second audio signal may be captured simultaneously.

The first direction and the second direction may be identified from audio signals captured at the same time instant.

The directions and/or the energy parameters may be identified by using coherence analysis at different delays between at least the first audio signal and the second audio signal.

The coherence analysis may be performed in a time-frequency domain.

The coherence analysis may comprise identifying time delays with highest levels of coherence between the first audio signal and the second audio signal.

The memory circuitry and the computer program code may be configured to, with the processing circuitry, cause the apparatus to define an angular range around a direction and omitting directions from this angular range from the coherence analysis to identify the second direction.

The coherence analysis may comprise estimating an energy ratio for the first direction and estimating an energy ratio for the second direction.

The memory circuitry and the computer program code may be configured to, with the processing circuitry, cause the apparatus to obtain at least a third audio signal where the third audio signal is captured by the microphone array wherein the microphone array comprises at least three microphones.

The first direction and/or the second direction may be identified as part of a spatial audio capture process.

The memory circuitry and the computer program code may be configured to, with the processing circuitry, cause the apparatus to provide at least the first audio signal, the second audio signal and metadata to one or more synthesisers to enable the first audio signal and the second audio signal and the metadata to be used to synthesise a spatial audio signal wherein the metadata comprises information indicative of the first direction and the second direction and/or information indicative of the first energy ratio and the second energy ratio.

According to various, but not necessarily all, examples of the disclosure there is provided an apparatus comprising means for: obtaining at least a first audio signal and a second audio signal wherein the first audio signal and the second audio signal are captured by a microphone array comprising at least two microphones; identifying, for a plurality of frequency bands, at least a first direction; and identifying, for a plurality of frequency bands, at least a second direction corresponding; wherein the first direction and the second direction are identified by using delay parameters between at least the first audio signal and the second audio signal.

The means may be configured to perform any of the methods described below.

According to various, but not necessarily all, examples of the disclosure there is provided an electronic device comprising an apparatus as described above and a plurality of microphones.

The electronic device may comprise one or more transceivers configured to enable wireless communication.

According to various, but not necessarily all, examples of the disclosure there is provided a method comprising: obtaining at least a first audio signal and a second audio signal wherein the first audio signal and the second audio signal are captured by a microphone array comprising at least two microphones; identifying, for a plurality of frequency bands, at least a first direction; and identifying, for a plurality of frequency bands, at least a second direction corresponding; wherein the first direction and the second direction are identified by using delay parameters between at least the first audio signal and the second audio signal.

The method may comprise identifying a first energy parameter and identifying a second energy parameter.

The energy parameter may comprise a ratio.

The directions and the energy parameters may be determined for each frequency band.

Different frequency bands may be used to identify the second direction and/or the second energy parameter than first direction and/or the first energy parameter.

Wherein wider frequency bands may be used to identify the second direction and/or the second energy parameter than are used to identify the first direction and/or the first energy parameter.

The first direction may correspond to a first direction of arrival for sound and the second direction corresponds to a second direction of arrival for sound.

The first audio signal and the second audio signal may be captured simultaneously.

The first direction and the second direction may be identified from audio signals captured at the same time instant.

The directions and/or the energy parameters may be identified by using coherence analysis at different delays between at least the first audio signal and the second audio signal.

The coherence analysis may be performed in a time-frequency domain.

The coherence analysis may comprise identifying time delays with highest levels of coherence between the first audio signal and the second audio signal.

The method may comprise defining an angular range around a direction and omitting directions from this angular range from the coherence analysis to identify the second direction.

The coherence analysis may comprise estimating an energy ratio for the first direction and an energy ratio for the second direction.

The method may comprise obtaining at least a third audio signal where the third audio signal is captured by the microphone array wherein the microphone array comprises at least three microphones.

The first direction and/or the second direction may be identified as part of a spatial audio capture process.

The method may comprise providing at least the first audio signal, the second audio signal and metadata to one or more synthesisers to enable the first audio signal and the second audio signal and the metadata to be used to synthesise a spatial audio signal wherein the metadata comprises information indicative the first direction and the second direction and/or information indicative of the first energy ratio and the second energy ratio.

According to various, but not necessarily all, examples of the disclosure there is provided a computer program comprising computer program instructions that, when executed by processing circuitry, cause: obtaining at least a first audio signal and a second audio signal wherein the first audio signal and the second audio signal are captured by a microphone array comprising at least two microphones; identifying, for a plurality of frequency bands, at least a first direction; and identifying, for a plurality of frequency bands, at least a second direction; wherein the first direction and the second direction are identified by using delay parameters between at least the first audio signal and the second audio signal.

According to various, but not necessarily all, examples of the disclosure there is provided a physical entity embodying the computer program as described above.

According to various, but not necessarily all, examples of the disclosure there is provided an electromagnetic carrier signal carrying the computer program as described above.

According to various, but not necessarily all, examples of the disclosure there is provided an apparatus comprising: processing circuitry; and memory circuitry including computer program code, the memory circuitry and the computer program code configured to, with the processing circuitry, cause the apparatus to: receive at least a first audio signal, a second audio signal and metadata; enable synthesising a spatial audio signal using the first audio signal and the second audio signal and the metadata wherein the metadata comprises information indicative the first direction and the second direction and/or information indicative of the first energy ratio and the second energy ratio.

According to various, but not necessarily all, examples of the disclosure there is provided an apparatus comprising means for: receiving at least a first audio signal, a second audio signal and metadata; enabling synthesising a spatial audio signal using the first audio signal and the second audio signal and the metadata wherein the metadata comprises information indicative the first direction and the second direction and/or information indicative of the first energy ratio and the second energy ratio.

BRIEF DESCRIPTION

For a better understanding of various examples that are useful for understanding the detailed description, reference will now be made by way of example only to the accompanying drawings in which.

DETAILED DESCRIPTION

Examples of the disclosure relate to spatial audio processing. In examples of the disclosure two or more directions of arrival for sound can be identified. The sounds may occur spectrally and temporally simultaneously. That is the sounds may be detected by the microphones at the same time and may also encompass some of the same frequency bands. In some examples the sounds may be detected based on the microphone signals at the same time. Examples of the disclosure reduce artifacts in the rendered audio and so provides for an improved spatial audio output. The method can be implemented using processing techniques. In examples of the disclosure, the method is not reliant on the microphones that are used to capture the audio signals being set out in a particular configuration and/or being a particular type of microphone. This enables the invention to be used with devices such as mobile phones where the type of microphones used and the arrangement of the microphones within the device may be restricted by the other hardware components within the device, the device shape and/or other factors.

Figure 1:
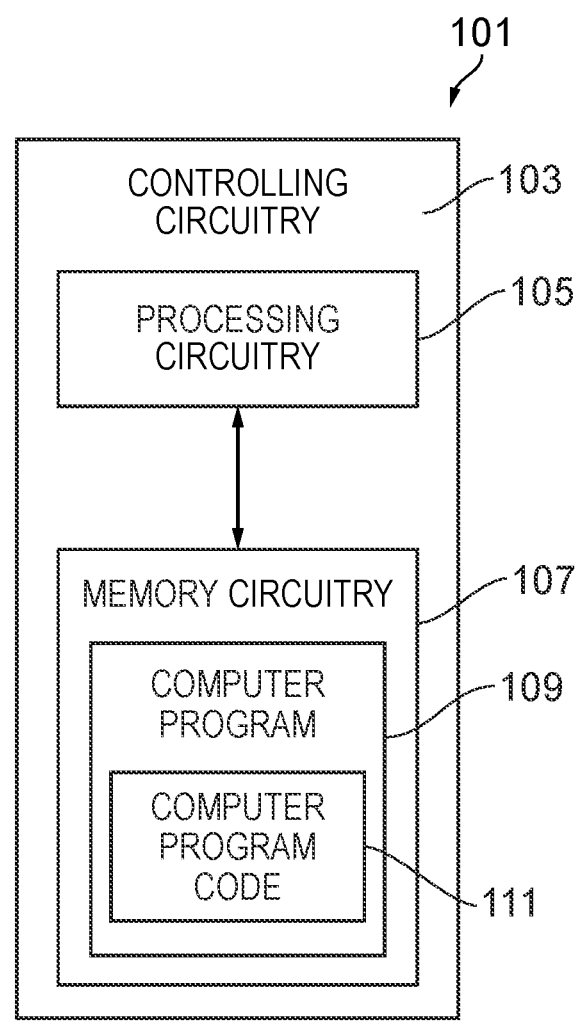
FIG. 1 illustrates an example apparatus.

FIG. 1 schematically illustrates an apparatus 101 according to examples of the disclosure. The apparatus 101 illustrated in FIG. 1 may be a chip or a chip-set. In some examples the apparatus 101 may be provided within devices such as an audio capturing device. In some examples the apparatus 101 may be provided within an electronic device such as a mobile telephone or other communications device.

The apparatus 101 comprises controlling circuitry 103. The controlling circuitry 103 may provide means for controlling an electronic device. The controlling circuitry 103 may also provide means for performing the methods, or at least part of the methods, of examples of the disclosure.

The apparatus 101 comprises processing circuitry 105 and memory circuitry 107. The processing circuitry 105 may be configured to read from and write to the memory circuitry 107. The processing circuitry 105 may comprise one or more processors. The processing circuitry 105 may also comprise an output interface via which data and/or commands are output by the processing circuitry 105 and an input interface via which data and/or commands are input to the processing circuitry 105.

The memory circuitry 107 may be configured to store a computer program 109 comprising computer program instructions (computer program code 111) that controls the operation of the apparatus 101 when loaded into processing circuitry 105. The computer program instructions, of the computer program 109, provide the logic and routines that enable the apparatus 101 to perform the example methods described above. The processing circuitry 105 by reading the memory circuitry 107 is able to load and execute the computer program 109.

The computer program 109 may arrive at the apparatus 101 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), or an article of manufacture that tangibly embodies the computer program. The delivery mechanism may be a signal configured to reliably transfer the computer program 109. The apparatus may propagate or transmit the computer program 109 as a computer data signal. In some examples the computer program code 109 may be transmitted to the apparatus 101 using a wireless protocol such as Bluetooth, Bluetooth Low Energy, Bluetooth Smart, 6LoWPan (IP$_v$6 over low power personal area networks) ZigBee, ANT+, near field communication (NFC), Radio frequency identification, wireless local area network (wireless LAN) or any other suitable protocol.

Although the memory circuitry 107 is illustrated as a single component in the figures it is to be appreciated that it may be implemented as one or more separate components some or all of which may be integrated/removable and/or may provide permanent/semi-permanent/dynamic/cached storage.

Although the processing circuitry 105 is illustrated as a single component in the figures it is to be appreciated that it may be implemented as one or more separate components some or all of which may be integrated/removable.

References to "computer-readable storage medium", "computer program product", "tangibly embodied computer program" etc. or a "controller", "computer", "processor" etc. should be understood to encompass not only computers having different architectures such as single/multi-processor architectures, Reduced Instruction Set Computing (RISC) and sequential (Von Neumann)/parallel architectures but also specialized circuits such as field-programmable gate arrays (FPGA), application-specific integrated circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Figure 2:
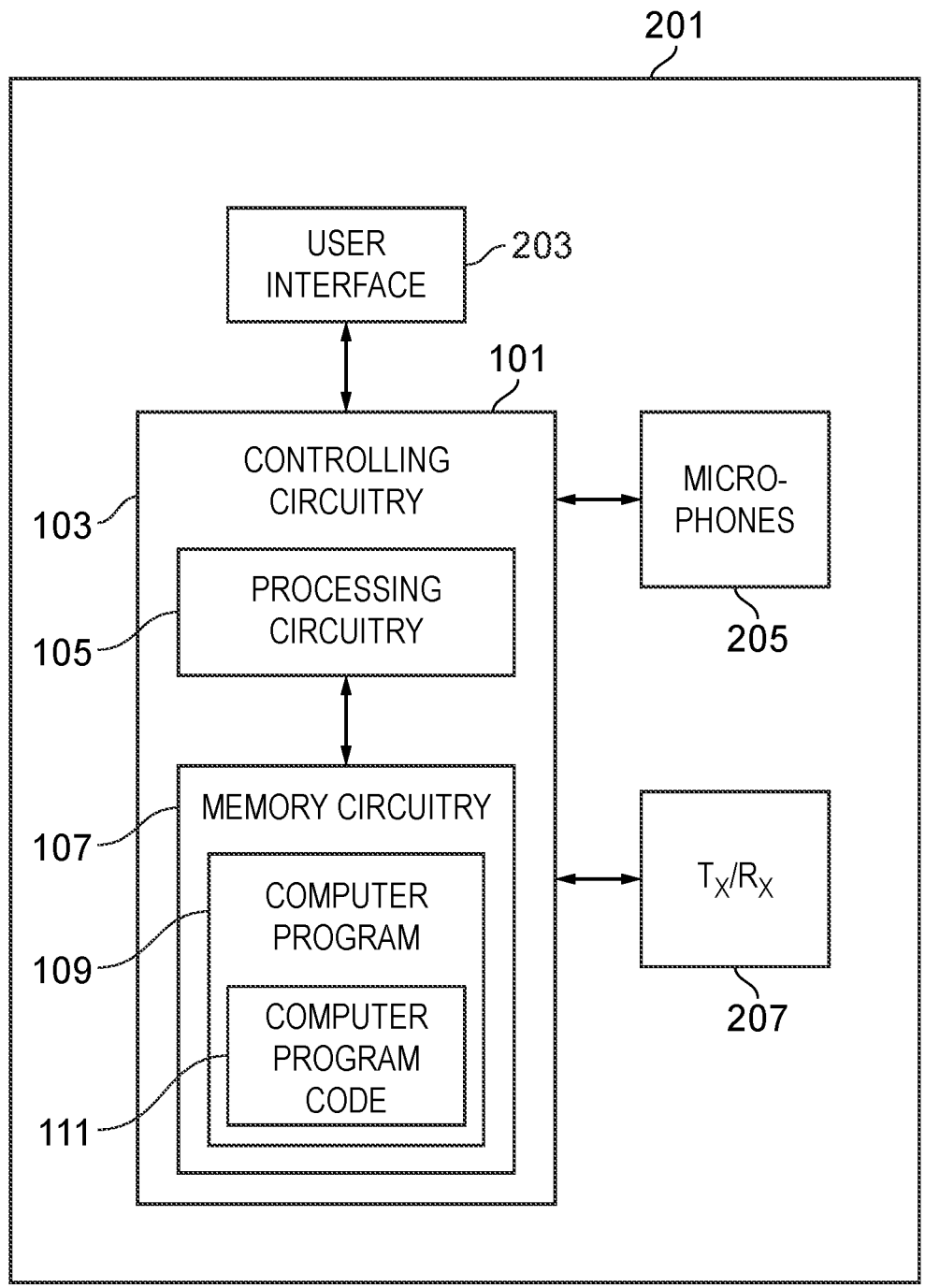
FIG. 2 illustrates an example electronic device.

FIG. 2 illustrates an example electronic device 201 according to examples of the disclosure. The electronic device 201 comprises an apparatus 101, a user interface 203, a plurality of microphones 205 and one or more transceivers 207. It is to be appreciated that only components referred to in the description have been shown in FIG. 2 and that the electronic device 201 may comprise additional components that have not been shown in FIG. 2. For example the electronic device 201 could also comprise a power source and other suitable components.

The user interface 203 may comprise any means which enables a user of the electronic device 201 to make user inputs and/or enables outputs to be provided to the user. In some examples the user interface 203 could comprise a display. The display could be a touch sensitive display which may enable information to be provided to a user and may also enable a user to make touch user inputs. Other types of user interfaces could be used in other examples of the disclosure.

The plurality of microphones 205 comprise any means configured to convert a sound signal into an electrical output signal. The microphones 205 may therefore capture sound signals and provide audio signals as an output. The audio signals may be electric signals that represent the captured sound signals.

In examples of the disclosure the electronic device 201 may comprise a plurality of microphones 205. The plurality of microphones 205 may be provided in a microphone array. The plurality of microphones 205 may comprise two or more microphones 205. For example an electronic device

201 such as mobile phone could comprise three or more microphones 205. Other types of electronic device 201 might comprise other numbers of microphones.

The plurality of microphones 205 may be spatially distributed within the electronic device 201 so that different microphones 205 are positioned in different locations within the electronic device 201. The position of the microphones 205 may be, at least in part, determined by other components of the electronic device 201. For example, where the user interface 203 comprises a display a first microphone could be positioned at a first end of the display and a second microphone could be positioned at a second end of the display.

The transceivers 207 may comprise any suitable means for receiving and/or transmitting information. The transceivers 207 may comprise one or more transmitters and/or receivers. The transceivers 207 may enable a wireless connection between the electronic device 201 and another entity. The wireless connection could be a wireless connection such as a cellular connection, a WiFi connection, a Bluetooth connection or any other suitable type connection.

The electronic device 201 could be any suitable type of electronic device 201. In some examples the electronic device 201 could be a communications device such as a mobile phone, personal computer or other suitable device. In some examples the electronic device could be an imaging device such as a camera which may be configured to record still and/or video images. The electronic device 201 may be a handheld device which may be intended to be held in a user's hand during normal use of the electronic device 201.

Figure 3:
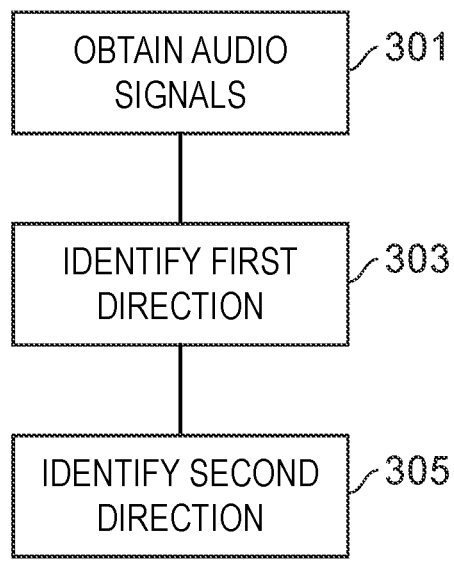
FIG. 3 illustrates an example method.

FIG. 3 illustrates an example method which may be implemented using the apparatus 101 and electronic devices 201 as described.

The method comprises, at block 301, obtaining at least a first audio signal and a second audio signal. The first audio signal and the second audio signals maybe outputs from the plurality of microphones 205 that may be provided to the apparatus 101. The first audio signal and the second audio signal may be captured by a microphone array comprising a plurality of microphones. The first audio signal may be captured by a first microphone and the second audio signal may be captured by a second microphone. The microphones 205 maybe located at different positions within an electronic device 201 so that a delay in the second audio signal compared to the first audio signal, or vice versa, gives information about the direction from which sound arrives relative to the microphones 205.

The first audio signal and the second audio signal are captured simultaneously. This may enable the first direction and the second direction to be identified from audio signals captured at the same time instant.

At block 303 the method comprises identifying at least a first direction for a plurality of frequency bands. The first direction corresponds to a first direction of arrival for sound. A first sound may be identified to arrive from the first direction. The first direction could be identified by performing coherence analysis at a plurality of different delays between at least the first audio signal and the second audio signal. The coherence analysis could be performed for different frequency bands of the detected sound. The first direction could be determined for each of the plurality of frequency bands. In some examples the first direction could be determined for at least a subset of the frequency bands.

The coherence analysis may be performed in a time-frequency domain. The coherence analysis comprises identifying time delays with highest levels of correlation between the first audio signal and the second audio signal.

The method also comprises, at block 305 identifying at least a second direction for a plurality of frequency bands. The second direction corresponds to a second direction of arrival for sound. A second sound may be identified to arrive from the second direction. The second direction could be identified by performing further coherence analysis at a plurality of different delays between at least the first audio signal and the second audio signal. The coherence analysis could be performed for different frequency bands of the detected sound. The second direction could be determined for each of the plurality of frequency bands. In some examples the second direction could be determined for at least a subset of the frequency bands.

The further coherence analysis used to identify the second direction may comprise a similar process to the coherence analysis used to identify the first direction. In some examples the coherence analysis used to identify the second direction may use different frequency bands than the coherence analysis used to identify the first direction. In some examples the coherence analysis used to identify the second direction uses wider frequency bands than the coherence analysis used to identify the first direction.

In examples of the disclosure the coherence analysis may comprise estimating an energy parameter for the first direction and the further coherence analysis may comprise estimating an energy parameter for the second direction. The energy parameter could be a ratio. In other examples the energy parameter could be a directional stability index or any other suitable parameter. The energy parameters may be determined for a plurality of frequency bands. The energy parameters may be determined for each of the plurality of frequency bands. In some examples the energy parameters may be determined for a subset of the plurality of frequency bands In some examples the further coherence analysis may comprise defining an angular range around the first direction and omitting directions from this angular range from the further coherence analysis to identify the second direction.

In some examples the first direction and/or the second direction and/or the energy parameters may be identified by using a spatial audio capture process In the example of FIG. 3 the method comprises obtaining a first audio signal and a second audio signal. It is to be appreciated that in other examples the method may comprise obtaining more than two audio signals. For example, if three or more audio signals are obtained this may enable directional analysis in three dimensions. In such examples the method may comprise obtaining at least a third audio signal where the third audio signal is captured by a third microphone.

Figure 4:
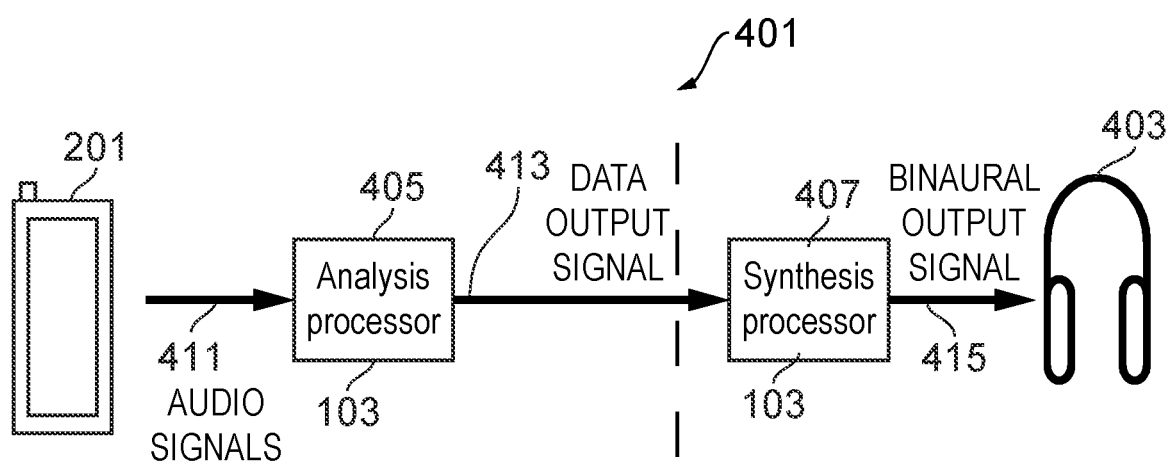
FIG. 4 illustrates an example system.

FIG. 4 illustrates an example system 401 according to examples of the disclosure. The system 401 comprises an electronic device 201 and a rendering device 403. It is to be appreciated that in some examples the system 401 may comprise additional devices. For example a storage device could be provided to store the signals from the electronic device 201 so that they can be accessed by the rendering device 403.

The electronic device 201 may be a device as shown in FIG. 2 or any other suitable type of electronic device comprising two or more microphones 205. In the example of FIG. 2 the electronic device 201 comprises a mobile phone. Other types of electronic device 201 may be used in other examples of the disclosure.

The electronic device 201 comprises a plurality of microphones 205. The plurality of microphones 205 may be configured in an array where the plurality of microphones 205 are spatially distributed from each other. The plurality of microphones 205 are configured to capture two or more audio signals 411.

The electronic device 201 is configured so that the audio signals 411 captured by the plurality of microphones 205 are provided to processing circuitry 103. The processing circuitry 103 may be configured to analyse the audio signals 411. The processing circuitry 103 may therefore provide an analysis processor 405.

The processing circuitry 103 may be configured to analyse the audio signals 411 to determine the directions from which sound arrives relative to the microphones 205. The processing circuitry 103 may be configured to identify two or more directions of arrival for the sound. The processing circuitry 103 may be configured to identify two or more directions of arrival for the sound for a plurality of different frequency bands.

The processing circuitry 103 may be configured to identify two or more directions of arrival for the sound for each frequency band.

Once the directions have been identified the processing circuitry 103 provides a data output signal 413. The data output signal 413 comprises information indicative of the captured audio signal. In some examples the data output signal 413 may comprise processed audio signals. For example, processes such as noise reduction, equalization, gain control, or any other suitable process may have been applied to the audio signals.

The data output signal 413 may also comprise metadata. The metadata may comprise spatial information relating to the captured audio signals. The spatial information may comprise information relating to two or more directions of arrival and the energy ratios for each of those directions. The spatial information may comprise information that is obtained as a result of the analysis performed by the processing circuitry 103.

The electronic device 201 may be configured to transmit the output data signal 413. The one or more transceivers 207 of the electronic device 201 may enable the output data signal 413 to be transmitted by a wireless communication link or any other suitable type of communication link.

In the example system of FIG. 4 the data output signal 413 is transmitted to the rendering device 403. The rendering device 403 may comprise processing circuitry 103 and the data output signal 413 may be provided to the processing circuitry 103 within the rendering device 403. In other examples the data output signal 413 may be provided to processing circuitry 103 which may then be configured to transmit the data output signal 413 to a separate rendering device 403.

In the example of FIG. 4 the rendering device 403 comprises headphones. In other examples the data output signal 413 could be transmitted to other types of device, for example the data output signal 413 could be transmitted to one or more remote servers to enable the data output signal to be stored remotely. When the data output signal 413 is stored in the remote servers the remote servers may be accessed by one or more devices such as the rendering device 403.

The rendering device 403 may comprise any means which may be configured to obtain an electrical input signal and convert the electrical input signals to an audible output signal. In the example system 401 of FIG. 4 the rendering device 403 comprises a head set. The head set maybe configured to provide binaural audio outputs to a user. Other types of rendering device 403 may be used in other examples of the disclosure. For example the rendering device 403 could be a loudspeaker or any other type of rendering device.

When the data output signal 413 is obtained by the rendering device 403 the data output signal 413 may be provided to processing circuitry 103. The processing circuitry 103 may be configured to synthesize the data output signal 413 which has been obtained by the rendering device 403. The processing circuitry 103 of the rendering device 403 may therefore provide a synthesis processor 407.

In the example of FIG. 4 the processing circuitry 103 of the rendering device 403 may be configured to use the metadata of the data output signal 413 to provide a binaural output signal 415. The binaural output signal 415 may be a spatial output signal which enable a user to perceive spatial characteristics of the captured audio. Other types of spatial output signal may be provided in other examples of the disclosure. For example, where the rendering device 403 comprises one or more loudspeakers the spatial output signal may comprise a multichannel signal.

In the example system 401 of FIG. 4 the electronic device 201 is configured to both capture the audio signals and process the audio signals. It is to be appreciated that in other example systems 401 the audio capturing and the audio processing could be performed by two or more different devices. For example the audio capturing could be performed by an electronic device 201 such as mobile phone or an imaging capturing device and the audio processing could be performed by a remote processing device such as one or more servers.

Also in the example system of FIG. 4 the capturing electronic device 201 and the rendering device 403 are provided as separate devices. In other examples the electronic device 201 which captures the audio signals could also be arranged to render the audio signals. For example, the electronic device 201 may capture and process the audio signals at a first point in time. The data output signals 413 may then be stored and accessed at a later point in time by the same electronic device 201 to enable the data output signals 413 to be rendered to an audible signal for a user. In other examples the data output signals 413 may be stored temporarily and rendered while the microphones 205 are detecting the audio signals. This may enable the audio signals to be rendered immediately after they have been captured and/or with a small delay.

Figure 5:
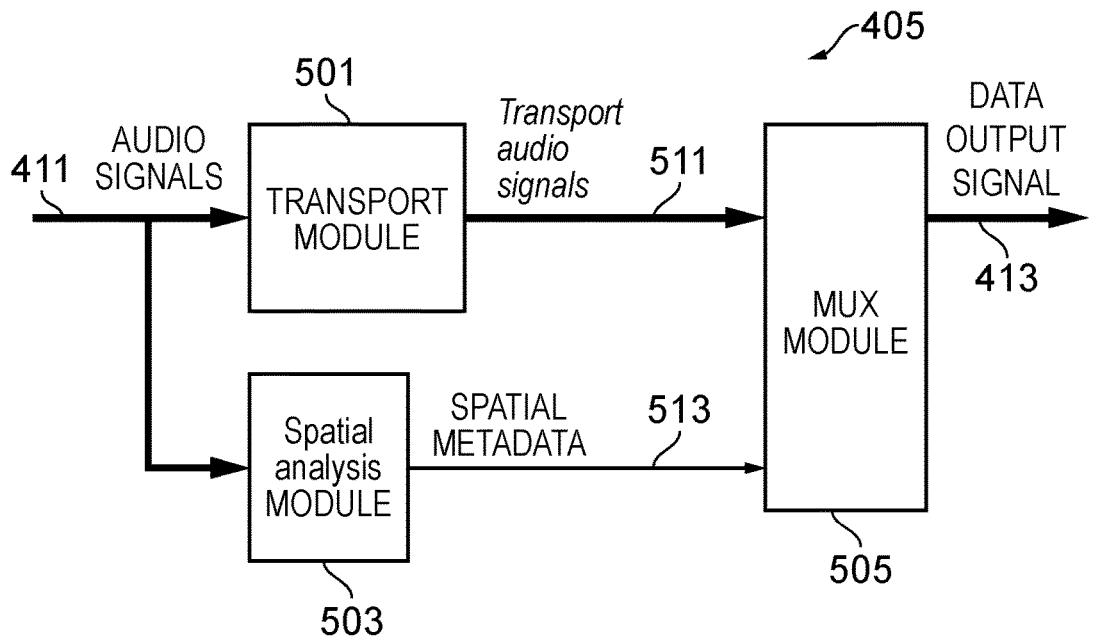
FIG. 5 illustrates an example analysis processor.

FIG. 5 illustrates an analysis processor 405 according to examples of the disclosure. The analysis processor 405 may be provided with an audio capturing device and/or within an audio processing device. The analysis processor 405 may be provided within an electronic device 201 as described above. The analysis processor 405 may be provided by the processing circuitry 103 of the electronic device 201.

The analysis processor 405 is configured to receive the audio signals 411 as an input. The audio signals 411 may comprise signals captured by a plurality of microphones 205.

The analysis processor 405 comprises a transport module 501, a spatial analysis module 503 and a multiplexing module 505. It is to be appreciated that the analysis processor 405 could comprise different modules in other examples of the disclosure.

The transport module 501 may comprise means for creating transport audio signals. The transport audio signals 511 may be created using any suitable process. In some examples the transport audio signals 511 may be selected from the input audio signals 411. In some examples the transport audio signals 511 may be downmixed from the input audio signals 411, or processed from the input audio signals 411 using beamforming techniques or any other suitable process. In some examples the transport audio signals 511 may be obtained by processing the input audio signals 411. The processing of the input audio signals 411 could comprise noise attenuation, equalization, gain control and/or any other suitable processing.

The transport audio signals 511 may comprise any suitable number of signals. In some examples the transport audio signals may comprise two transport audio signals.

In some examples the transport module 501 may also comprise means to encode the transport audio signals 511. Any suitable process may be used for the encoding. For example, advanced audio coding (AAC), enhanced voice services (EVS) or any other suitable audio encoding techniques may be used.

The spatial analysis module 503 comprises means for determining the directional information of the input audio signals 411. The spatial analysis module 505 may provide an output signal comprising spatial metadata 513. The spatial metadata 513 comprises spatial information relating to the captured audio signals. The spatial metadata 513 may comprise any information which enables spatial properties of the captured audio to be recreated. In some examples the spatial metadata 513 may comprise information relating to two or more directions of arrival and the energy ratios for each of those directions fora plurality of frequency bands. In some examples the spatial metadata 513 may comprise information relating to two or more directions of arrival and the energy ratios for each of those directions for each of the available frequency bands. The spatial metadata 513 may comprise information that is obtained as a result of the analysis performed by the spatial analysis module 505. The spatial metadata 513 may be provided in frequency bands.

The transport audio signals 511 and the spatial metadata 513 are provided as inputs to the multiplexing module 505. The multiplexing module 505 comprises means to multiplex the transport audio signals 511 and the spatial metadata 513 to provide the data output signal 413.

Figure 6:
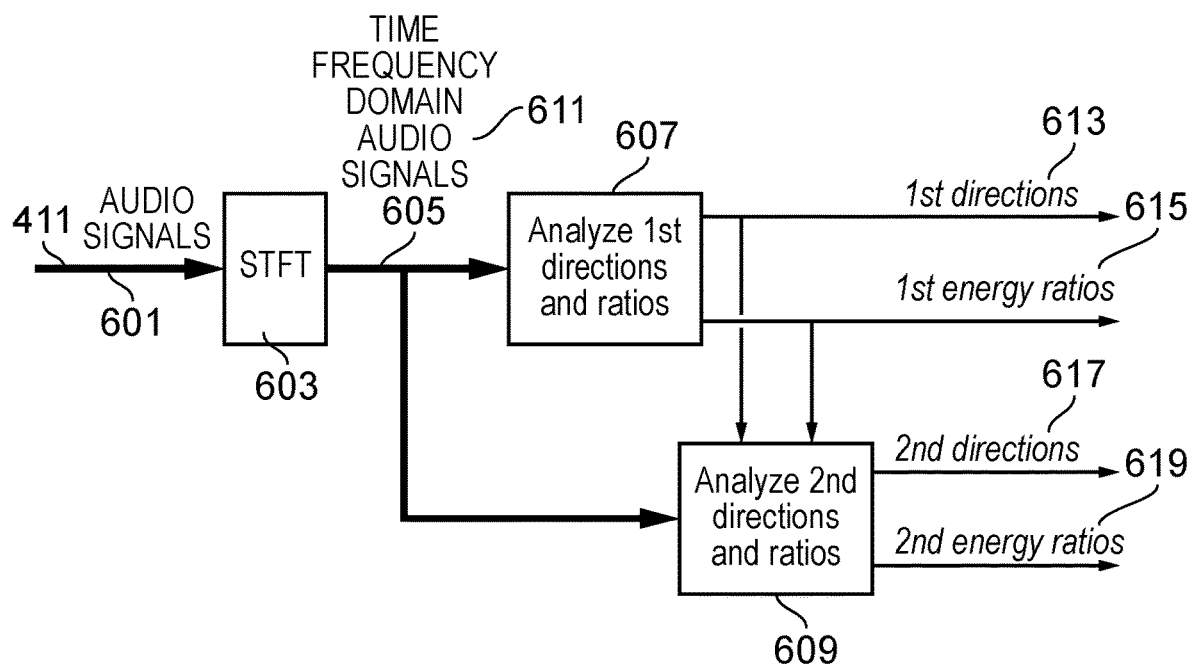
FIG. 6 illustrates an example spatial analysis process.

FIG. 6 illustrates an example spatial analysis process. The example spatial analysis process may be performed by the spatial analysis module 505 or by any other suitable means.

At block 601 the audio signals 411 are obtained. The audio signals 411 may be obtained from the plurality of microphones 205.

At block 603 the audio signals 411 are transformed from the time domain to a time-frequency domain. In the example of FIG. 6 the transformation is performed using a short-time Fourier transform (STFT). In other examples the transformation could be performed using a complex quadrature mirror filterbank (QMF) or any other suitable means.

At block 605 the output of the transform is provided as time-frequency domain audio signals 611. The time-frequency domain audio signals 611 can be denoted as $S_i(b,n)$ where i is the microphone channel index, b is the frequency bin index and n is the temporal frame index. The frequency bins can be grouped into sub-bands that group on or more of the frequency bins into a band index k where k=0, . . . k−1. Each sub-band k has a lowest frequency bin $b_{k,low}$ and a highest frequency bin $b_{k,high}$ and the sub-band contains all the frequency bins between $b_{k,low}$ and $b_{k,high}$. The widths of the sub-bands may be selected to approximate any suitable distribution, such as the equivalent rectangular bandwidth (ERB), the Bark scale or any other suitable distribution.

At block 607 the time-frequency domain audio signals 611 are analysed to obtain a first direction 613 and energy ratios 615 for the first direction. At block 607 the time-frequency domain audio signals 611 may be analysed to produce an estimate of direction $\theta_1(k,n)$ and an estimate of an energy ratio $r_1(k,n)$ for each frequency band. Any suitable process may be used to estimate the direction and the energy ratio. In some examples the process may comprise a spatial audio capture (SPAC) process in which the most prominent direction from which the sound arrives in the frequency band is estimated. The SPAC process may also comprise estimating the ratio between the energy originating from the most prominent direction in relation to the total energy of the frequency band.

The output of the analysis performed at block 607 is a first direction signal 613 which comprises information of the estimate of the first direction $\theta_1(k,n)$ and a first energy ratio signal 615 which comprises information of the energy ratio $r_1(k,n)$.

At block 609 the time-frequency domain audio signals 611 are analysed to obtain a second direction $\theta_2(k,n)$ and energy ratios $r_2(k,n)$ for the second direction. The first direction signal 613 and the first energy ratio signal 615 may be used to enable the second direction 617 and the energy ratios 619 for the second direction to be estimated. Any suitable process may be used to estimate the second direction 617 and the second energy ratio 619. In some examples the process may comprise a spatial audio capture (SPAC) process in which one or more prominent directions of arrival of sound in the frequency band is estimated. This may be similar to the method used to obtain the estimate of the first direction 613 and the first energy ratios 615.

The output of the analysis performed at block 609 is a second direction signal 617 which comprises information of the estimate of the second direction $\theta_2(k,n)$ and a second energy ratio signal 619 which comprises information of the energy ratio $r_2(k,n)$.

Any suitable method may be used to estimate the first direction $\theta_1(k,n)$ and the corresponding energy ratio $r_1(k,n)$. For instance, where the input audio signal 411 comprises two microphone channels the analysis processor 405 may be configured to find the delay $\tau_k$ that maximizes the correlation between the two microphone channels for a given frequency band k. In some examples the delay $\tau_k$ may be determined by creating time shifted versions of the one of microphone channels and comparing these to the other microphone channel. Time-shifted versions of the time-frequency signal $S_{m,\tau}(b,n)$ can be obtained by;

$$S_{m,\tau}(b, n) = S_m(b, n)e^{-j\frac{2\pi b \tau}{N}}$$

Where N represents the length of the STFT transformation that is used to transform the audio signals 411 from the time domain to a time-frequency domain.

The delay $\tau_k$ that maximizes the correlation between the two microphone channels for a given frequency band k, and for a given time index n, is obtained from:

$$\tau_k = \mathrm{argmax}_\tau \sum_{b=b_{k,low}}^{b_{k,high}} \mathrm{Re}(S_{2,\tau}^*(b, n)S_1(b, n)), \tau \in [-D_{max}, D_{max}]$$

Where Re represents the real part of the result and * represents the complex conjugate. The range of the delays $D_{max}$ that is searched is selected based on a maximum time delay of sound arriving to the two microphones 205. The maximum sound delay could correspond to that of sound arriving from the axis determined by a pair of microphones 205.

As the physical distribution of the microphones 205 is known, for example from the configuration of the microphones 205 within an electronic device, the first direction can be determined from the estimated delay $\tau_k$. If $D_{max}$ is the maximum time delay for sound arriving at the two microphones 205 then, in examples where the microphones 205 are in a horizontal plane, the delay $\tau_k$ can be converted into an angular value $\theta_1$ where $$\theta_1(k, n) = \cos^{-1}\left(\frac{\tau_k}{D_{max}}\right)$$

The angle $\theta_1$ therefore provides the first estimated direction.

Once the first direction has been estimated the energy ratio $r_1(k,n)$ may be determined. The energy ratio $r_1(k,n)$ represents the energy originating from the first estimated direction in relation to the total energy of the frequency band. The energy ratio $r_1(k,n)$ may be estimated from the normalized correlation value, $$r_1(k, n) = \frac{\sum_{b=b_{k,low}}^{b_{k,high}} \text{Re}(S^*_{2,\tau_k}(b, n)S_1(b, n))}{\sum_{b=b_{k,low}}^{b_{k,high}} (|S_{2,\tau_k}(b, n)||S_1(b, n)|)}$$

In this described example the input audio signal 411 comprises two microphone channels. This may enable a direction to be estimated within an arc of 180 degrees in a single plane. Where more than two microphone channels are provided this may enable a direction to be estimated within a greater range of angles. For example, it may enable a direction to be estimated within 360 degrees or may enable three dimensional estimates.

Figure 7:
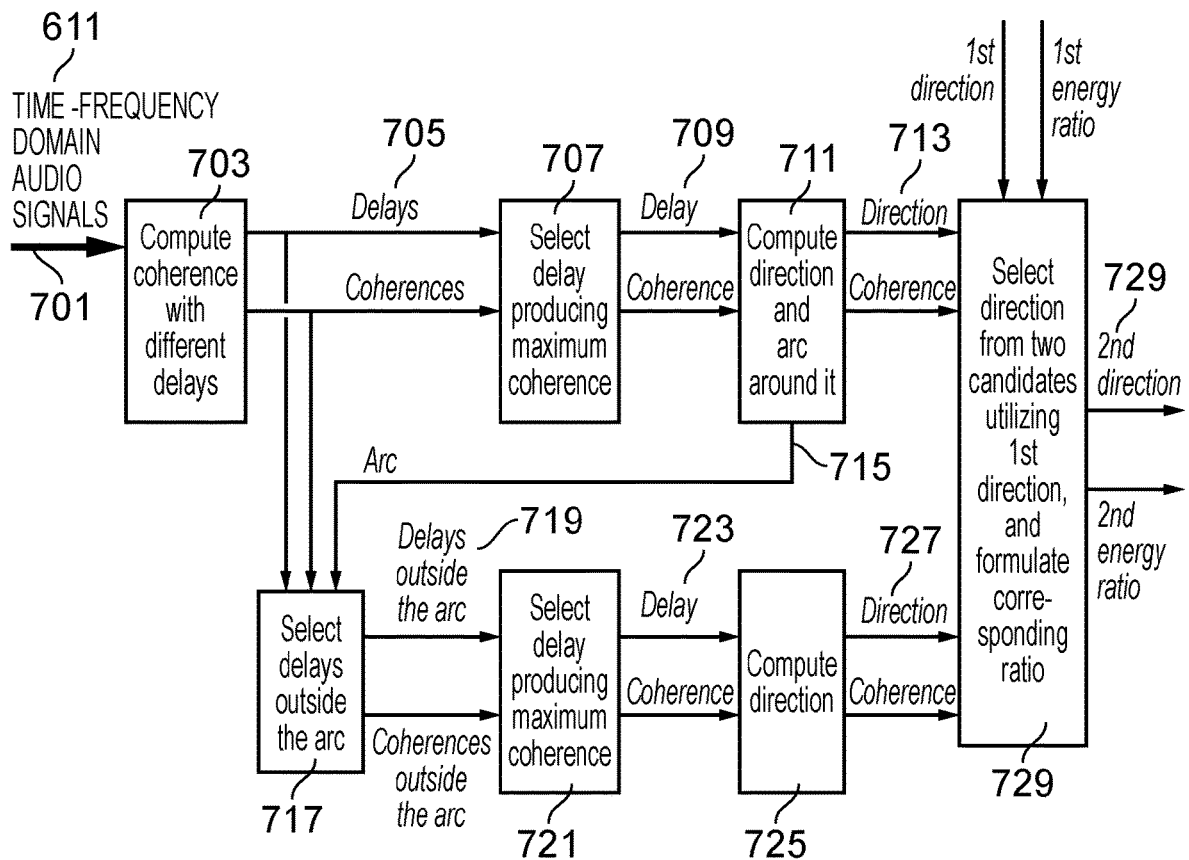
FIG. 7 illustrates an example method for identifying a second direction.

FIG. 7 illustrates a method for identifying a second direction that may be used in some examples of the disclosure. The method of FIG. 7 may be performed by an analysis processor 405 or by any other suitable means.

At block 701 the time-frequency domain audio signals 611 are obtained. The time-frequency domain audio signals 611 may be obtained using the method of FIG. 6 or any other suitable method.

At block 703 the coherences between the audio signals obtained by the different microphones are computed for different delays. The delays may be created by time shifting one or more of the microphone channels. This provides an output signal at block 705 comprising information indicative of the delays and information indicative of the coherences.

At block 703 the coherences may be computed for different frequency bands. The frequency bands used to estimate the coherences for the second direction may be different to the frequency bands used to estimate the coherences for the first direction. The borders of the frequency bands used to estimate the second direction may be different to the borders of the frequency bands used to estimate the first direction. That is $b_{k,low}$ and $b_{k,high}$ might be different for the second direction compared to the second direction. The borders of the frequency bands used to estimate the second direction are therefore denoted as $b'_{k,low}$ and $b'_{k,high}$. For instance, in some examples the frequency bands for the first direction may be approximated by the ERB scale while the frequency bands used for the second direction may be wider. The wider frequency bands reduce interference from the first direction, and the ambient energy, with the second direction. In some examples the frequency bands used for the second direction may comprise the full audio band or nearly the full audio band. In some examples each of the frequency bands used for the second direction may have the same width so as to reduce computational complexity.

The delay estimates between the microphone channels for a given frequency band k, and for a given time index n, is obtained from the correlations $\gamma'(k,n,\tau)$ $$\gamma'(k, n, \tau) = \sum_{b=b'_{k,low}}^{b'_{k,high}} \text{Re}(S^*_{2,\tau}(b, n)S_1(b, n)), \tau \in [-D_{max}, D_{max}]$$

At block 707 the delay $\tau'_1$ providing the maximum coherence $\gamma'_1$ is selected so that at block 709 an output signal comprising information indicative of the delay giving the maximum coherence and the maximum coherence is provided.

At block 711 the temporary direction $\alpha'_1$ corresponding to the identified delay is computed. The direction may be computed using the known configuration of the plurality of microphones 205. The direction $\alpha'_1$ is temporary in that it is used, in addition to a second temporary direction $\alpha'_2$ to obtain the final second output direction $\theta_2$.

At block 711 an arc around the temporary direction $\alpha'_1$ may also be computed. The arc may represent an angular range around the direction. The angular range may be of a predetermined value. The arc may be determined as $$\alpha'_1 - \xi < \beta'_1 < \alpha'_1 + \xi$$

where $2\xi$ is the width of the arc. The width of the arc could be 30 degrees or any other suitable angular width.

This gives an output at block 713 comprising information indicative of the computed direction and the corresponding coherence in a normalized form. The information may comprise the set of delay values corresponding to angles $\beta'_1$ within the arc. The set of delay values maybe represented as $\tau_{86}$.

The process at block 711 also produces an output at block 715 comprising information indicative of the arc. At block 717 the information indicative of the arc is used to select delays outside of the arc. This gives an output at block 719 of the delays outside of the arc and the coherences $\gamma'_{\bar{\xi}}$ outside of the arc.

At block 721 the delay $\tau'_2$ outside of the arc which provides the maximum coherence $\gamma'_2$ is selected so that at block 723 an output signal comprising information indicative of the delay $\tau'_2$ giving the maximum coherence and the corresponding maximum coherence $\gamma'_2$ in a normalized form is provided.

At block 725 the direction $\alpha'_2$ corresponding to the identified delay $\tau'_2$ is computed. The direction $\alpha'_2$ may be computed using the known configuration of the plurality of microphones 205. This gives an output at block 727 which comprises information indicative of the computed direction $\alpha'_2$ and the corresponding maximum coherence $\gamma'_2$ in a normalized form.

At block 729 the second direction is selected from the directions $\alpha'_1$ and $a'_2$ obtained at block 711 and 725. The default second direction may be $a'_2$ which corresponds to the second largest maximum coherence $\gamma'_2$. However this might not always be the case because different frequency bands are used to determine the first direction $\theta_1$ and the possible second directions $\alpha'_1$ and $a'_2$. The use of the different frequency bands could cause $\theta_1$ and $a'_2$ to be the same or nearly the same. In such cases $\alpha'_2$ may be selected as $\theta_2$. In some examples $\theta_2(k,n)$ may be selected as $$\theta_2(k, n) = \begin{cases} \alpha'_2, |\alpha'_2 - \theta_1(k, n)| > \chi \vee |\alpha'_2 - \theta_1(k, n)| > |\alpha'_1 - \theta_1(k, n)| \\ \alpha'_1, |\alpha'_2 - \theta_1(k, n)| < \chi \wedge |\alpha'_2 - \theta_1(k, n)| < |\alpha'_1 - \theta_1(k, n)| \end{cases}$$

The threshold $\chi$ may be any suitable angular range. In some examples the threshold $\chi$ may be 20 degrees.

In this example the absolute value operator |·| also wraps the angular difference to ±180 degrees before the absolute value is obtained.

At block 729 the second energy ratio is also estimated. In some examples the estimate of the second energy ratio $r'_2(k,n)$ may be obtained from the normalized value of the coherence $\gamma'_2$. Alternatively, in some examples the estimate of the second energy ratio $r'_2(k,n)$ may be obtained from the normalized value of the coherence value $\gamma'_1$ or $\gamma'_2$ corresponding to which angle $\alpha'_1$ and $\alpha'_2$ was selected.

In some examples the second energy ratio $r'_2(k,n)$ may be adjusted to ensure that the sum of the first energy ratio and the second energy ratio is less than one. In some examples the second energy ratio may be adjusted so that the sum of the first energy ratio and the second energy ratio has a value smaller than one, for example 0.9. This may avoid artifacts in the ambient energy. In such examples the adjusted second energy ratio $r''_2(k,n)$ may be given by $$r''_2(k,n) = \max(T_1 - r_1(k,n), 0), \text{ if } r_1(k,n) + r'_2(k,n) > T_1$$

$$r''_2(k,n) = r'_2(k,n), \text{ else}$$

In some examples the second energy ratio $r_2(k,n)$ could also be adjusted to ensure the second energy is not greater than the first energy ratio $r_1(k,n)$ because the first energy ratio corresponds to the main direction. In such examples the second energy ratio $r_2(k,n)$ may be limited to be smaller than the first energy ratio $r_1(k,n)$. In some examples the second energy ratio $r_2(k,n)$ maybe limited to be smaller than a fraction of the first energy $r_1(k,n)$, for example 0.9 of the first energy ratio $r_1(k,n)$. This may be obtained by multiplying the first energy ratio $r_1(k,n)$ by a threshold $T_2$ where the threshold $T_2$ is less than one. In such examples the second energy ratio $r_2(k,n)$ may be given by $$r_2(k,n) = T_1 r_1(k,n), \text{ if } r''_2(k,n) > T_2 r_1(k,n)$$

$$r_2(k,n) = r''_2(k,n), \text{ else}$$

Therefore block 727 gives an output 729 which comprises the second direction $\theta_2$ and the second energy ratio $r_2(k,n)$.

In some examples further modification may be performed on the second direction $\theta_2$ and the second energy ratio $r_2(k,n)$. For example the second direction $\theta_2$ and the second energy ratio $r_2(k,n)$ may be temporally smoothed.

In the example of FIG. 7 the time-frequency domain audio signals 611 are obtained from two microphones 205. This enables the directions and energy ratios to be estimated for a 180 degree arc. It is to be appreciated that the time-frequency domain audio signals 611 could be obtained from more than two microphones 205 in other examples of the disclosure. This could enable the directions and energy ratios to be obtained in a 360 degree arc. In such examples the method of FIG. 7 may be modified to enable the additional time-frequency domain audio signals 611 to be used.

For instance, where the time-frequency domain audio signals 611 comprises at least three audio signals obtained from three microphones the first time-frequency-domain samples $S_1(b,n)$ and the second time-frequency-domain samples $S_2(b,n)$ are delay adjusted and summed together. The delay adjustment may be based on the first direction $\theta_1(k,n)$. This may provide a temporary sample $S_s(b,n)$. This process may be effectively a delay-sum beamforming towards the estimated first direction $\theta_1(k,n)$. The third time-domain samples $S_3(b,n)$ are then delayed with two possible delays. The two possible delays may correspond to the possible front and back angles. For example if $\theta_1(k,n)$ has a value of 30 degrees this could be a front angle of 30 degrees or a rear angle of 150 degrees. The coherence may then be computed between the temporary sample $S_s(b,n)$ and the third time-domain sample $S_3(b,n)$ for both of the delay values. The delay value producing the higher coherence is selected as the correct delay. The estimated first direction $\theta_1(k,n)$ may be corrected if needed. For example the first direction $\theta_1(k,n)$ may be switched from a front angle of 30 degrees to a rear angle of 150 degrees. This procedure may also be repeated for the second direction $\theta_2(k,n)$.

Figure 8:
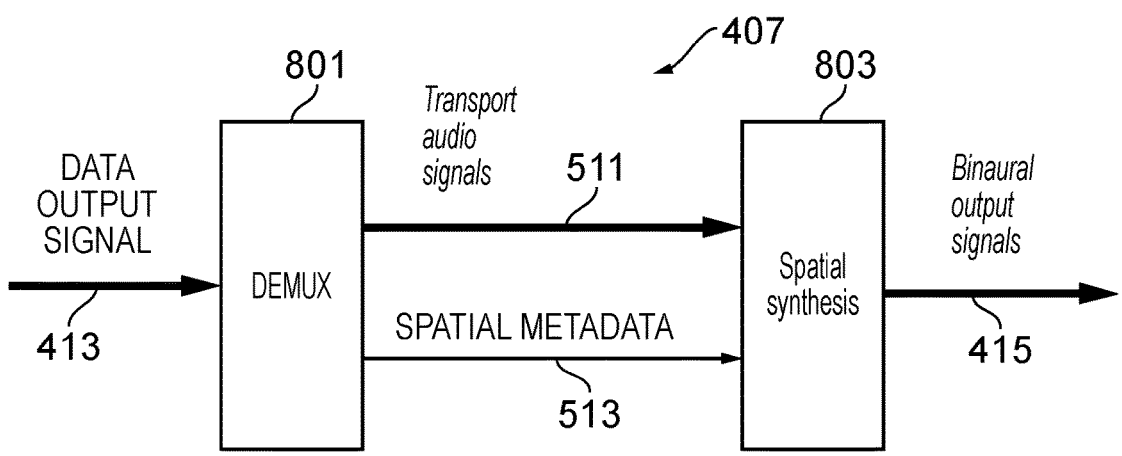
FIG. 8 illustrates an example synthesis processor.

FIG. 8 illustrates a synthesis processor 407 according to examples of the disclosure. The synthesis processor 407 may be provided within rendering device 403. The synthesis processor 407 may be provided by the processing circuitry 103 of the rendering device 403.

The synthesis processor 407 comprises a de-multiplexing module 801 and a spatial synthesis module 803. It is to be appreciated that the synthesis processor 407 could comprise different modules in other examples of the disclosure.

The synthesis processor 407 is configured to receive the data output signals 413 as an input. The data output signals 413 may comprise transport audio signals 511 and the spatial metadata 513 which may have been obtained as described.

The data output signal 413 is provided as an input to de-multiplexing module 801. The de-multiplexing module 801 comprises means for de-multiplexing the data output signal 413 into the transport audio signals 511 and the spatial metadata 513. In some examples the data output signal 413 could also be decoded. The type of decoder used may be dependent upon the type of encoding that has been used in the transport module.

The transport audio signals 511 and the spatial metadata 513 are provided as inputs to the spatial synthesis module 803. The spatial synthesis module 803 may comprise any means which may be configured to synthesize the transport audio signals 511 and the spatial metadata 513 so as to provide a binaural output signal 415. It is to be appreciated that other types of spatial audio signals may be provided as an output in other examples of the disclosure.

Any suitable method may be used to synthesize the transport audio signals 511 and the spatial metadata 513 so as to provide a binaural output signal 415. For instance, in some examples the frequency band signals can be multiplied by three different factors to obtain three different frequency band signals. The frequency band signals could be multiplied by a factor of $\sqrt{r_1(k,n)}$ to obtain a signal with the energy corresponding to the first direction. The frequency band signals could be multiplied by a factor of $\sqrt{r_2(k,n)}$ to obtain a signal with the energy corresponding to the second direction. The frequency band signals could be multiplied by a factor of $\sqrt{1-r_1(k,n)-r_2(k,n)}$ to obtain a signal with the energy corresponding to the ambient energy. The ambient energy may be the remainder energy which corresponds to neither the first nor the second direction.

The directional signals may be obtained using head related transfer functions (HRTFs) where the rendering device 403 comprises headphones. Other methods for obtaining the directional signals may be used in other examples of the disclosure. For example where the rendering device 403 comprises a loudspeaker the directional signals may be obtained by using amplitude panning or any other suitable means.

In some examples the ambient energy may also be processed. The processing that is performed on the ambient energy may be dependent upon the type of rendering device 403 that is being used. For example, where the rendering device 403 comprises headphones the signal representing the ambient energy may be decorrelated and adjusted in frequency bands so as to provide the binaural diffuse field coherence. Where the rendering device 403 comprises one or more loudspeakers the ambient energy could be decorrelated and spatially distributed to the available loudspeakers.

Figure 9:
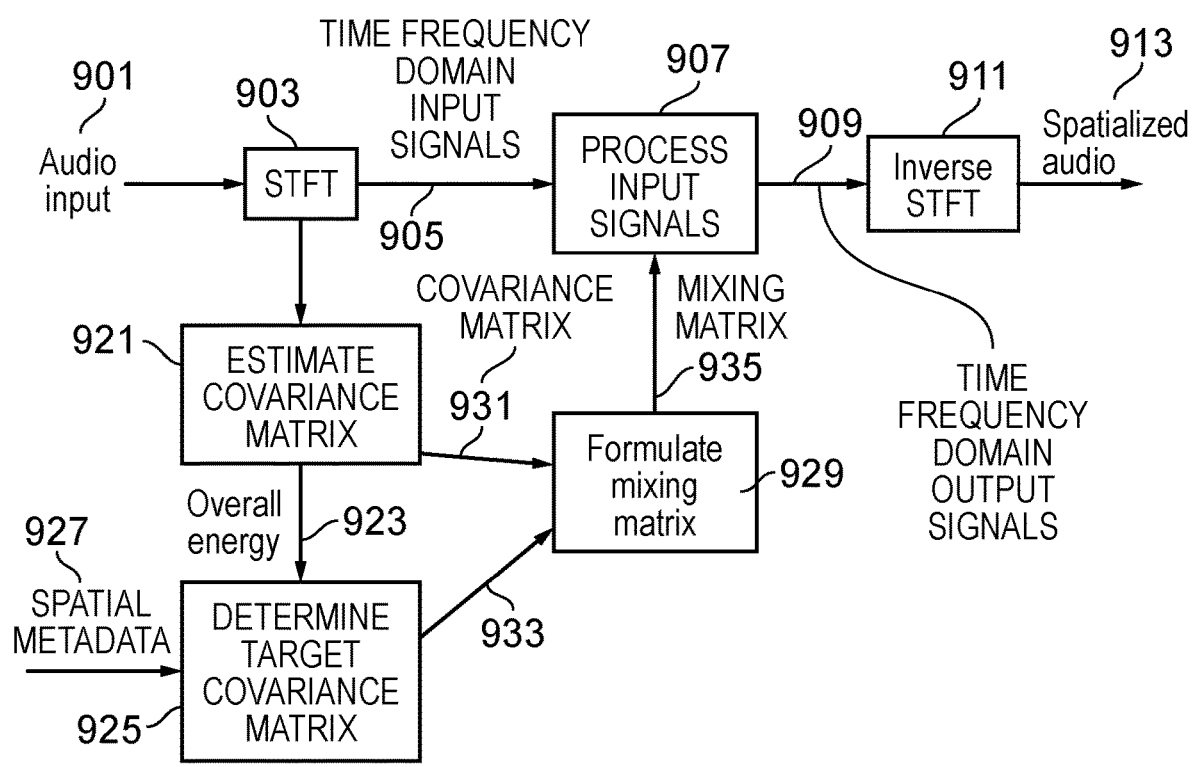
FIG. 9 illustrates another example method of spatial synthesis that may be performed by a spatial synthesis module.

FIG. 9 illustrates another example method of spatial synthesis that may be performed by the spatial synthesis module 803.

At block 901 input audio signals are received. The input audio signals may comprise spatial metadata comprising information about a plurality of different directions.

At block 903 the input audio signals are transformed to the time-frequency domain. In the example method of FIG. 9 the audio signals are transformed to the time-frequency domain by using a STFT. Other means for performing the transform could be used in other examples of the disclosure. This provides, at block 905 time-frequency domain input signals.

At block 907 the time-frequency domain input signals are adaptively processed. In some examples the time-frequency domain input signals may be adaptively processed using a mixing matrix. In some examples the time-frequency domain input signals may also be adaptively processed by using de-correlation. The de-correlation may be used in addition to the mixing matrix. This provides, at block 909, time-frequency domain output signals.

At block 911 the time-frequency domain output signals may be transformed back to the time domain by using an inverse STFT or any other suitable process to provide, at block 913 a spatialized audio output.

In order to enable the mixing matrix to be used for the adaptive processing of the time-frequency domain input signals the method may also comprise blocks which enable the mixing matrix to be formulated. In the example of FIG. 9, at block 921 an input covariance matrix is estimated from the audio input. This provides, at block 923, an output indicative of the overall energy of the input signal and also, at block 931 an output indicative of the input covariance matrix.

At block 925 the output indicative of the overall energy of the input signal and the spatial metadata 927 are used to determine the target covariance matrix. At block 933 an output comprising the target covariance matrix is provided.

The target covariance matrix and the actual covariance matrix are used, at block 929 to formulate a mixing matrix. The mixing matrix may be an optimal mixing matrix. The formulated mixing matrix is provided as an output at block 935 and can be used at block 907 as described above.

The method that is used to determine the target covariance matrix may be dependent upon the type of rendering device 403 that is being used to render the spatial audio. For example a different method may be used where the rendering device comprises one or more loudspeakers compared to if the rendering device comprises headphones.

For instance, where the rendering device 403 comprises a loudspeaker the total energy E of the target covariance matrix could be estimated based on the input covariance matrix. The total energy could be the sum of the diagonal elements of the input covariance matrix. It is to be appreciated that the energy E may be determined for different time indices n and frequency bands k. However, for clarity in the following description the time and frequency indices n and k have been omitted when not necessary.

Once the overall energy E has been determined the target covariance matrix $C_T$ is determined in mutually incoherent parts. The mutually incoherent parts comprise a directional part $C_D$ and an ambient or non-directional part $C_A$. The target covariance matrix $C_T$ may therefore be given by $$C_T = C_D + C_A$$

The ambient or non-directional part $C_A$ may be determined as $$C_A = (1 - r_1 - r_2)E \frac{I_{M \times M}}{M}$$

Where I is an identity matrix and M is the number of output channels. The ambient or non-directional part $C_A$ is diagonal which provides for incoherence between loudspeaker channels.

The directional part $C_D$ may be determined as $$C_D = [v_{VBAP}(\theta_1)v_{VBAP}^H(\theta_1)r_1 + v_{VBAP}(\theta_2)v_{VBAP}^H(\theta_2) r_2]E$$

Where $v_{VBAP}(\theta)$ is a column vector denoting the amplitude panning gains for a loudspeaker setup and the directional information from the spatial metadata. The column vector $v_{VBAP}(\theta)$ may have two non-zero values where two loudspeakers are used for the amplitude panning. Where the loudspeakers have a three dimensional layout the column vector $v_{VBAP}(\theta)$ may have three non-zero values.

The target covariance matrix $C_T$ is therefore be given by $$C_T = \left[ v_{VBAP}(\theta_1)v_{VBAP}^H(\theta_1)r_1 + v_{VBAP}(\theta_2)v_{VBAP}^H(\theta_2)r_2 + (1 - r_1 - r_2)\frac{I_{M \times M}}{M} \right]E$$

In examples where the rendering device 403 comprise headphones a binaural output may be provided. In order to provide the binaural output a similar method may be used to determine the target covariance matrix $C_T$. However HRTF data $v_{HRTF}(k, \theta)$ as a function of frequency band k and direction $\theta$ may be used instead of amplitude panning data to render the direct part. Also where a binaural output is to be provided binaural coherence is used instead of inter-channel coherence in rendering the ambient part.

Where a binaural output is to be provided the ambient or non-directional part $C_A$ may be determined as $$C_A(k, n) = (1 - r_1(k, n) - r_2(k, n))E(k, n) \begin{bmatrix} 1 & c_{bin}(k) \\ c_{bin}(k) & 1 \end{bmatrix}$$

Where $c_{bin}(k)$ is binaural diffuse field coherence for the frequency of the $k^{th}$ frequency index. The value of $c_{bin}(k)$ may be zero, or close to zero for high frequencies and may have a high value for low frequencies.

Also where a binaural output is to be provided the directional part $C_D$ may be determined as $$C_D(k,n) = [v_{HRTF}(k,\theta_1)v_{HRTF}^H(k,\theta_1)r_1(k,n) + v_{HRTF}(k,\theta_2)v_{HRTF}^H(k,\theta_2)r_2(k,n)]E$$

The target covariance matrix $C_T$ for binaural outputs is therefore be given by $$C_T(k,n) = \left[ v_{HRTF}(k,\theta_1)v_{HRTF}^H(k,\theta_1)r_1(k,n) + v_{HRTF}(k,\theta_2)v_{HRTF}^H(k,\theta_2)r_2(k,n) + (1 - r_1(k,n) - r_2(k,n)) \begin{bmatrix} 1 & c_{bin}(k) \\ c_{bin}(k) & 1 \end{bmatrix} \right] E$$

Where the spatial output comprises a spherical harmonics output such as an Ambisonics output the method for determining the target covariance matrix $C_T$ may be similar to the method used for the loudspeaker examples. However, where the spatial output comprises Ambisonics, Ambisonic panning gains may be used instead of amplitude panning gains. Also the energy distribution matrix $$\frac{I_{M \times M}}{M}$$

in the ambient or non-directional part $C_A$ may be replaced with a different energy distribution matrix. The different energy distribution matrix may be a diagonal matrix with coefficients corresponding to an Ambisonic normalization scheme. For example for an SN3D normalization scheme for a first-order Ambisonic output the matrix diagonal values would be $$\left[ 1 \quad \frac{1}{3} \quad \frac{1}{3} \quad \frac{1}{3} \right].$$

For a second order output the diagonal values would be the same, but appended with five values of ⅕ resulting in a matrix of size 9×9.

In some examples the method also comprises determining a prototype matrix. The prototype matrix defines a reference output signal for the rendering based on the input signal. The least squares optimized mixing solution can be formulated with reference to the prototype matrix. Where the rendering device 403 comprises a loudspeaker the prototype matrix may be configured so that signals for a left hand side loudspeaker are optimized with respect to the left channel of the audio input and similarly signals for a right hand side loudspeaker are optimized with respect to the right channel of the audio input. A central channel could be optimized with respect to the sum of the left and right hand sides. Where the rendering device 403 comprise headphones the prototype matrix could be configured so that the reference channel for the left ear output signal is the left audio input signal and similarly the reference channel for the right ear output signal is the right audio input signal. The prototype matrix may be determined using any suitable process.

Figure 10A:
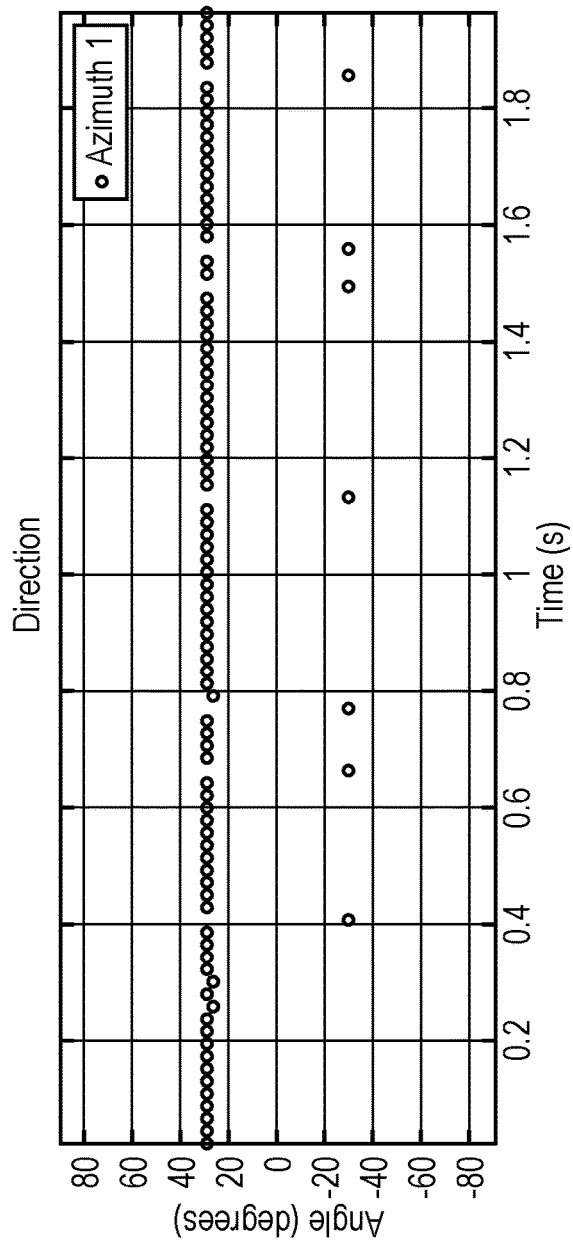
FIGS. 10A and 10B are plots of estimated directions and energy ratios for a first direction.
Figure 10B:
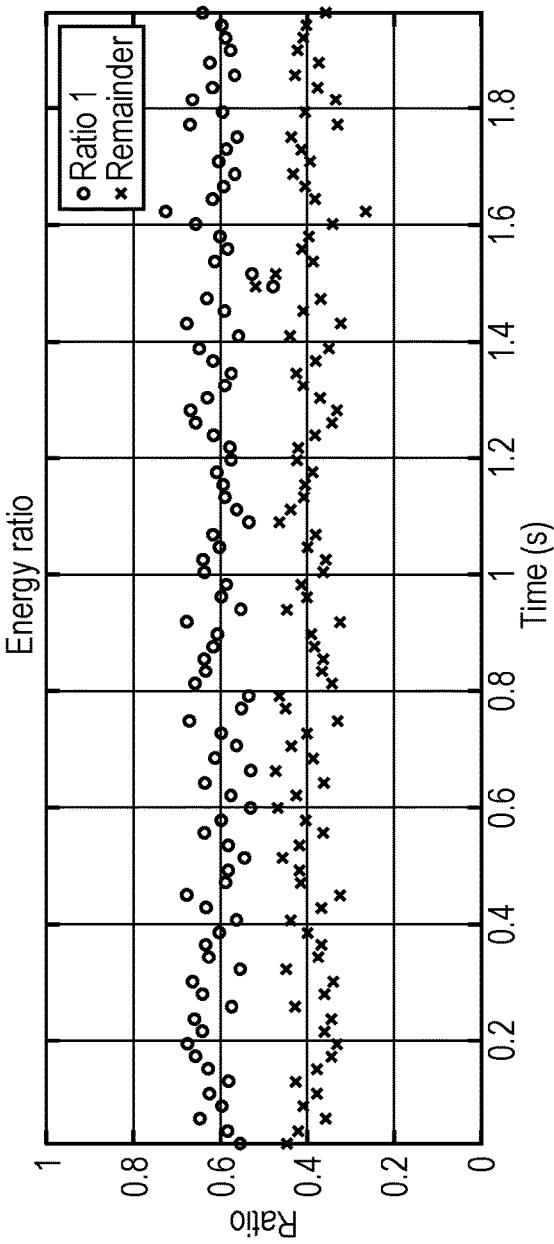

FIGS. 10A and 10B are plots of estimated directions and energy ratios for a first direction. FIG. 10A is a plot of the estimated first angle in degrees versus time in seconds and FIG. 10B is a plot of the estimated energy ratio for the same time period. The remainder energy is also shown on the plot of FIG. 10B.

Figure 11A:
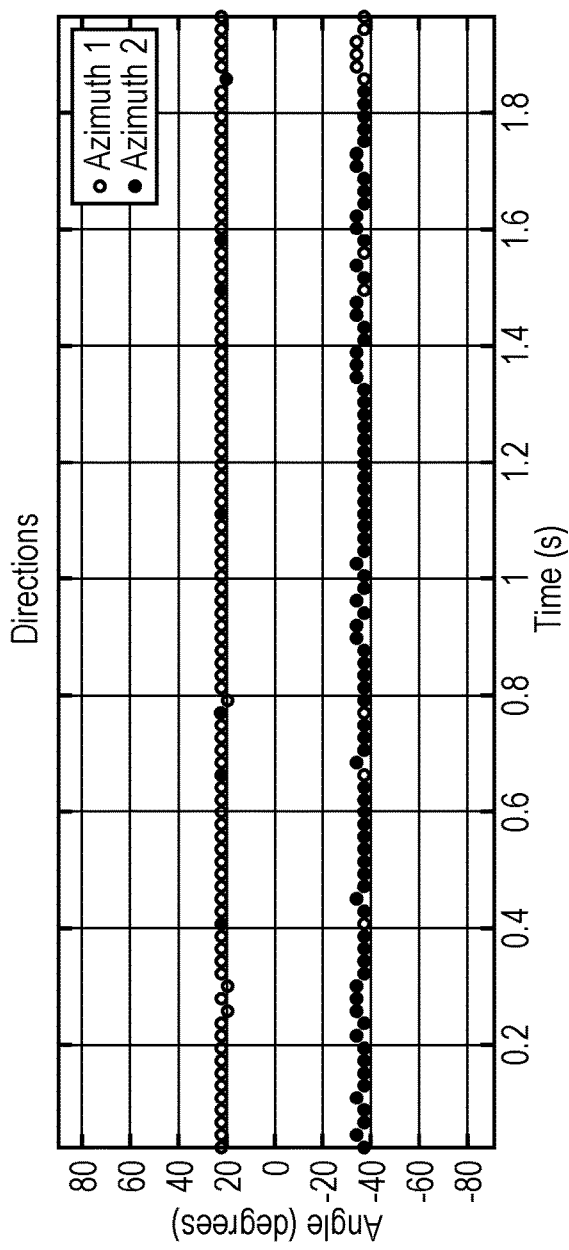
FIGS. 11A and 11B are plots of estimated directions and energy ratios for first direction and a second direction.
Figure 11B:
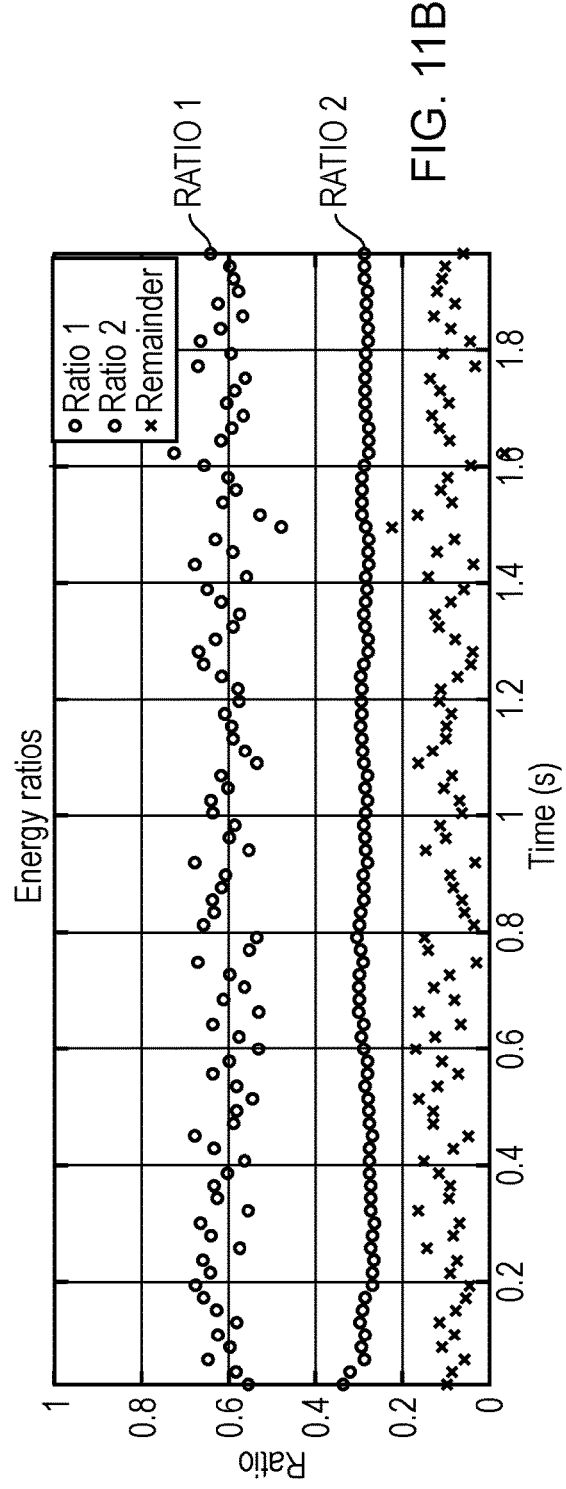

FIGS. 11A and 11B are plots of estimated directions and energy ratios for both a first direction and a second direction. FIG. 11A is a plot of the estimated first angle and the estimated second angle in degrees versus time in seconds and FIG. 11B is a plot of the estimated energy ratios for the same time period. The plot of FIG. 11B shows the energy ratio for the first direction and for the second direction. The remainder energy is also shown on the plot of FIG. 11B.

The results plotted in FIGS. 10A to 11B were obtained from a simulated scenario where two noise sources were simulated in an anechoic environment. A first sound source was simulated at +30 degrees and a second sound source was simulated at −30 degrees. The first sound source was 1 dB louder than the second sound source. The sound scene provided by the simulated sound sources was captured with a simulated array of microphones 205. The array of microphones 205 comprised two microphones positioned 14 cm apart from each other.

FIGS. 10A and 10B show the results obtained when just the first direction is estimated. In these results the estimated direction is mainly directed towards the louder source however there are also instances where the estimated direction is directed towards the secondary, quieter sound source. This may result in artifacts that can be perceived in the rendered audio signal.

Also as shown in FIG. 10B the energy ratio is low compared to the ambient energy. There is a significant amount of energy that is determined to be in the remainder energy that is reproduced as ambient energy. This may result in an anechoic sound scene being converted to a more reverberant sound scene due to the de-correlation needed for the reproduction of the ambient energy.

FIGS. 11A and 11B show the results where both a first direction and a second direction is estimated. In this case either the first direction or the second direction is directed to the sound sources for every time frame. Therefore, when the audio signal is reproduced stable audio objects are provided and there are no artifacts caused by the fluctuations.

Also as shown in FIG. 11B the energy ratio for the ambient energy is much lower as most of the energy can be attributed either to the first direction or the second direction. This causes less sound to be reproduced as ambient sound and so the anechoic acoustics of the simulated environment can be preserved. This therefore provides for improved audio quality.

Figure 12:
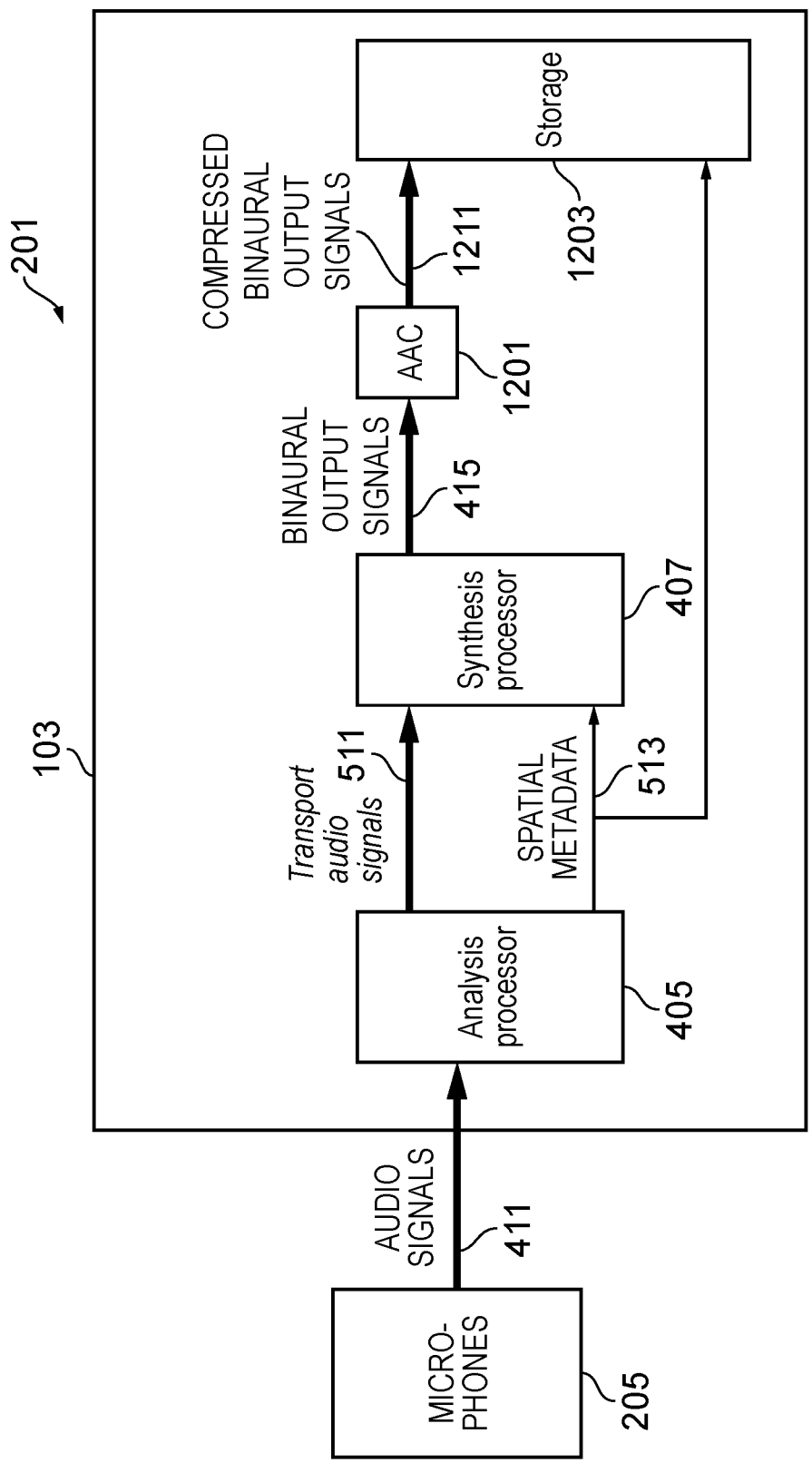
FIG. 12 illustrates an example electronic device.

FIG. 12 illustrates an example electronic device 201 that may be used in examples of the disclosure. In the example of FIG. 12 the electronic device 201 comprises an array of microphones 205, an analysis processor 405, a synthesis processor 407, a compression module 1201 and storage means 1203. The analysis processor 405, synthesis processor 407, compression module 1201 and storage means 1203 could be provided by controlling circuitry 103 or any other suitable means. The electronic device 201 could be a mobile phone or any other suitable type of electronic device.

The array of microphones 205 may comprise a plurality of microphones. The array of microphones 205 may comprise two or more microphones. The microphones 205 may be spatially distributed within the electronic device 201 so as to enable spatial audio to be captured. For example a first microphone could be positioned at a first end of the electronic device 201 and a second microphone could be positioned at a different end of the electronic device 201.

The array of microphones 205 are configured to capture audio signals 411 and provide the captured audio signals 411 to the controlling circuitry 103. In the example of FIG. 12 the audio signals 411 are provided to an analysis processor 405. The analysis processor 405 could be configured as described above.

The analysis processor 405 is configured to process the audio signals 411 to provide transport audio signals 511 and spatial metadata 513. The spatial metadata 513 may comprise information indicative of the first direction and also the second direction and may also comprise information indicative of the energy ratios for the first direction and the energy ratios for the second direction.

The electronic device 201 is configured so that the transport audio signals 511 and spatial metadata 513 are provided to a synthesis processor 407. The synthesis processor 407 is configured to process the transport audio signals 511 and spatial metadata 513 to provide binaural output signals 415. Other types of spatial output signals may be provided in other examples of the disclosure.

The binaural output signals 415 may be provided to a compression module 1201. The compression module 1201 may comprise any means which may be configured to reduce the size of the binaural output signals 415 for storage. In the example of FIG. 12 the compression module 1201 comprises an advanced audio coding (AAC) compression module. The compression module 1201 provides compressed binaural output signals 1211 as an output.

The compressed binaural output signals 1211 are provided to the storage means 1203. The storage means 1203 may comprise memory circuitry 107 or any other suitable means. The compressed binaural output signals 1211 may be stored with the spatial metadata 513 so that the spatial metadata can be retrieved with the compressed binaural output signals 1211.

The compressed binaural output signals 1211 may be retrieved from the storage means 1203 to enable the spatial audio to be rendered for a user. Where the use is using headphones as a rendering device the spatial audio may be rendered by directly reproducing the stored compressed binaural output signals 1211. If the user is using a different type of rendering device then other types of spatial audio output, such as a multichannel output, may be obtained by processing the compressed binaural output signals 1211 with the stored spatial metadata 513.

Figure 13:
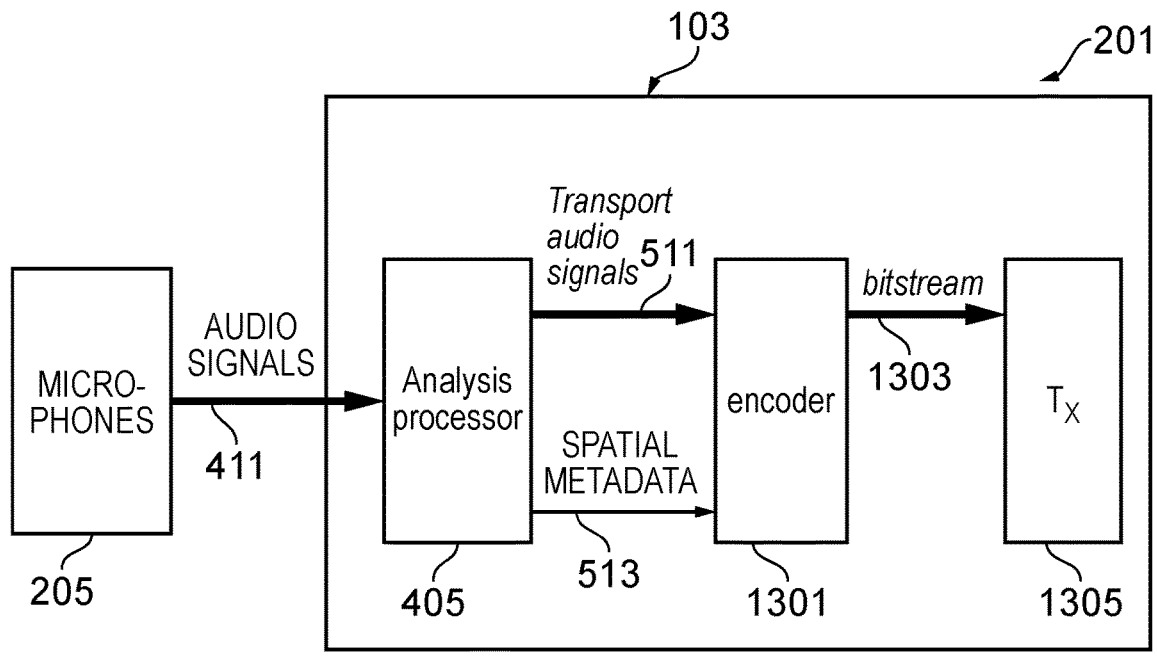
FIG. 13 illustrates another example electronic device.

FIG. 13 illustrates another example electronic device 201 that may be used in examples of the disclosure. In the example of FIG. 13 the electronic device 201 comprises an array of microphones 205, an analysis processor 405, an encoder module 1301 and a transmitter 1305. The analysis processor 405 and the encoder module 1301 could be provided by controlling circuitry 103 or any other suitable means. The electronic device 201 could be a mobile phone or any other suitable type of electronic device.

The array of microphones 205 may comprise a plurality of microphones. The array of microphones 205 may comprise two or more microphones. The microphones 205 may be spatially distributed within the electronic device 201 so as to enable spatial audio to be captured. For example a first microphone could be positioned at a first end of the electronic device 201 and a second microphone could be positioned at a different end of the electronic device 201.

The array of microphones 205 are configured to capture audio signals 411 and provide the captured audio signals 411 to the controlling circuitry 103. In the example of FIG. 13 the audio signals 411 are provided to an analysis processor 405. The analysis processor 405 could be configured as described above.

The analysis processor 405 is configured to process the audio signals 411 to provides transport audio signals 511 and spatial metadata 513. The spatial metadata 513 may comprise information indicative of the first direction and also the second direction and may also comprise information indicative of the energy ratios for the first direction and the energy ratios for the second direction.

The electronic device 201 is configured so that the transport audio signals 511 and spatial metadata 513 are provided to the encoder module 1301. The encoder module 1301 may comprise any means which may be configured to process the transport audio signals 511 and spatial metadata 513 into a format suitable for transmission. In the example of FIG. 13 the encoder module 1301 comprises an encoder which is configured to receive audio signals and associated spatial metadata as an input. The encoder is configured to encode and multiplex the transport audio signals 511 and spatial metadata 513 to a bitstream 1303. The encoder provides a bitstream 513 as an output. Any suitable type of encoder module 1301 could be used in examples of the disclosure.

The bitstream 1303 is provided to the transmitter 1305 to enable the bitstream 1303 to be transmitted to another device. The another device could be a rendering device. In such examples a decoder could be used to decode the bitstream 1303 by the rendering device. In other examples the bitstream 1303 could be transmitted to a storage device such as a remote server. The remote server may be configured to enable rendering devices to access the bitstream 1303 from the remote server. It is to be appreciated that in other examples of the disclosure the bitstream 1303 could be stored in the electronic device 201 instead of being transmitted to another device.

Figure 14:
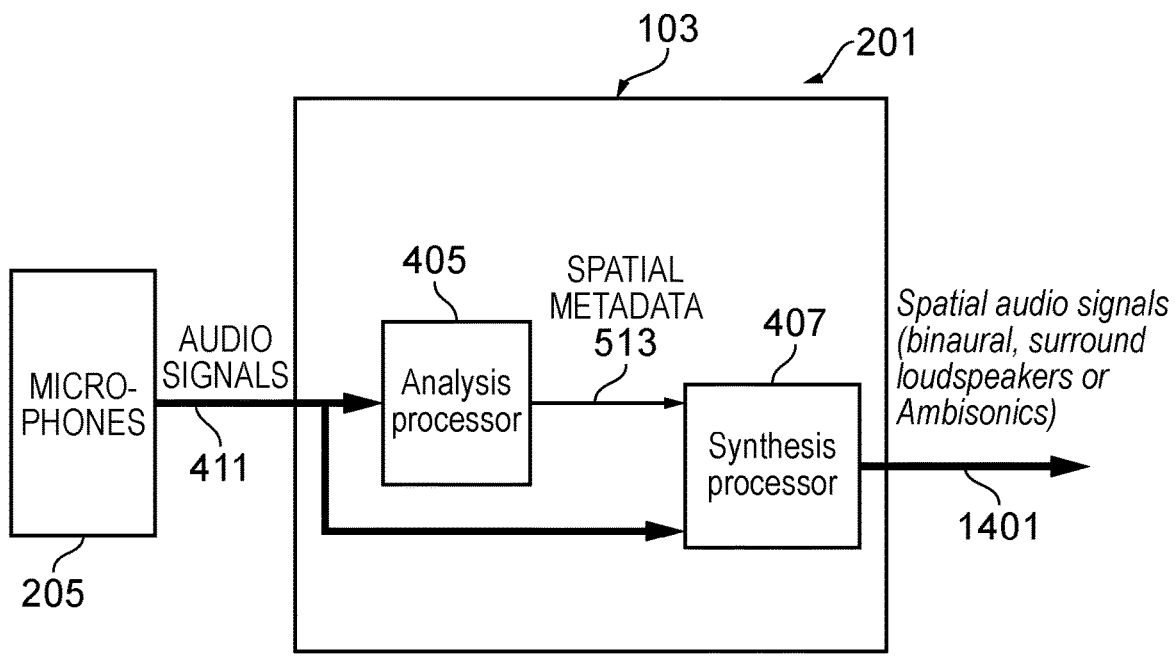
FIG. 14 illustrates another example electronic device.

FIG. 14 illustrates another example electronic device 201 that may be used in examples of the disclosure. In the example of FIG. 14 the electronic device 201 comprises an array of microphones 205, an analysis processor 405 and a synthesis processor 407. The analysis processor 405 and synthesis processor 407 could be provided by controlling circuitry 103 or any other suitable means. The electronic device 201 could be a mobile phone or any other suitable type of electronic device.

The array of microphones 205 may comprise a plurality of microphones. The array of microphones 205 may comprise two or more microphones. The microphones 205 may be spatially distributed within the electronic device 201 so as to enable spatial audio to be captured. For example a first microphone could be positioned at a first end of the electronic device 201 and a second microphone could be positioned at a different end of the electronic device 201.

The array of microphones 205 are configured to capture audio signals 411 and provide the captured audio signals 411 to the controlling circuitry 103. In the example of FIG. 14 the audio signals 411 are provided to the analysis processor 405 and also to the synthesis processor 407.

The analysis processor 405 is configured to process the audio signals 411 to provide spatial metadata 513. The spatial metadata 513 may comprise information indicative of the first direction and also the second direction and may also comprise information indicative of the energy ratios for the first direction and the energy ratios for the second direction.

The synthesis processor 407 is configured to process the spatial metadata 513 and the audio signals 411 to provide a spatial audio signal 1401. In some examples the audio signals 411 may be processed before they are provided to the synthesis processor 407. In some examples all of the audio signals 411 may be provided to the synthesis processor 407. In other examples only a subset of the audio signals 411 need to be provided to the synthesis processor 407.

The synthesis processor 407 is configured to process the transport audio signals 511 and spatial metadata 513 to provide spatial output signals 1401. The spatial output signals 1401 could be binaural output signals, loudspeaker output signals, Ambisonic signals or any other suitable type of signal.

The spatial output signals 1401 can be reproduced by any suitable rendering device such as headphones or a loudspeaker. In some examples the spatial output signals 1401 may be stored in the electronic device 201 or transmitted to another device.

In the examples described above the electronic device 201 comprises a mobile telephone. It is to be appreciated that other types of electronic device 201 could be used in other examples of the disclosure. For example the electronic device 201 could be an imaging device. The imaging device could be arranged to capture images for and audio for virtual reality applications. This may require spatial audio and multiple images to be obtained.

In some examples the synthesis processor 407 may be configured to perform audio focusing instead of, or in addition to, binaural processing. The audio focusing may comprise beamforming or any other suitable type of audio focusing. The audio focusing may comprise applying a further gain modification, in frequency bands, based on the estimates of the first direction and the second direction. This may enable the sound signals to be attenuated when the direction of arrival of the sounds is different to a focus direction. In some examples the synthesis processor 407 may also be configured to attenuate the ambient sounds to emphasize the direct sounds with respect to the ambient sounds.

Examples of the disclosure provide for improved spatial audio. The examples of the disclosure may provide for improved spatial audio in cases where there are two or more prominent audio sources. The audio sources may be in a dry acoustic environment however examples of the disclosure could also be used in other types of environment. The examples of the disclosure may reduce artifacts in the spatial audio. The artifacts could have been caused by fluctuations between the different prominent audio sources. However in examples of the disclosure each of the prominent audio sources may be identified and so the fluctuations would be eliminated.

The example method also reduces artifacts which may be caused by de-correlation because some of the ambient energy is reproduced as part of the second direction. This therefore reduces the remaining energy that is de-correlated and so reduces any artifacts that this may cause.

In some examples of the disclosure it might not be possible to determine the second direction. In such examples the disclosure could be implemented using just the first direction. This still enables an adequate quality audio signal to be provided even if the second direction cannot be determined.

Examples of the disclosure can be implemented using any type of microphone arrays. There is no need for the microphones 205 to be configured in a particular spatial arrangement. This enables the disclosure to be implemented in electronic devices 201 such as mobile phones where the position of the microphones 205 may be restricted by the user interface and/or other hard ware components of the electronic device 201.

In the examples described in this description the term coupled means operationally coupled. Any number of components may be provided between coupled components including zero components.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   processing circuitry; and
   memory circuitry including computer program code, the memory circuitry and the computer program code configured to, with the processing circuitry, cause the apparatus to:
   obtain at least a first audio signal and a second audio signal, wherein the first audio signal and the second audio signal are captured with a microphone array comprising at least two microphones;
   identify, for a first plurality of frequency bands of at least the first audio signal and the second audio signal, at least a first direction; and identify, for a second plurality of frequency bands of at least the first audio signal and the second audio signal, at least a second direction;

wherein the first direction and the second direction are identified using delay parameters between at least the first audio signal and the second audio signal, wherein the second direction is identified using information related to the first direction.

2. An apparatus as claimed in claim 1, wherein the memory circuitry and the computer program code are configured to, with the processing circuitry, cause the apparatus to identify a first energy parameter and a second energy parameter, wherein the second energy parameter is identified using information related to the first energy parameter.

3. An apparatus as claimed in claim 2, wherein at least one of the first energy parameter or the second energy parameter comprises an energy ratio.

4. An apparatus as claimed in claim 2, wherein the first direction and the first energy parameter are determined for respective frequency bands of the first plurality of frequency bands, and wherein the second direction and the second energy parameter are determined for respective frequency bands of the second plurality of frequency bands.

5. An apparatus as claimed in claim 2, wherein different frequency bands are used to identify the second direction and/or the second energy parameter than the first direction and/or the first energy parameter.

6. An apparatus as claimed in claim 2, wherein wider frequency bands are used to identify the second direction and/or the second energy parameter than are used to identify the first direction and/or the first energy parameter.

7. An apparatus as claimed in claim 1, wherein the first direction corresponds to a first direction of arrival of a first sound and the second direction corresponds to a second direction of arrival of a second sound.

8. An apparatus as claimed in claim 1, wherein the first audio signal and the second audio signal are captured simultaneously.

9. An apparatus as claimed in claim 1, wherein the first direction and the second direction are identified from audio signals captured at a same time instant, wherein the second plurality of frequency bands is at least partially different from the first plurality of frequency bands, wherein the first plurality of frequency bands and the second plurality of frequency bands at least partially overlap.

10. An apparatus as claimed in claim 2, wherein the first direction and/or the first energy parameter is identified using coherence analysis at a first delay between at least the first audio signal and the second audio signal, wherein the second direction and/or the second energy parameter is identified using coherence analysis at a second delay between at least the first audio signal and the second audio signal, wherein the second delay is different from the first delay.

11. An apparatus as claimed in claim 10, wherein the coherence analysis comprises identifying time delays with highest levels of coherence between the first audio signal and the second audio signal.

12. An apparatus as claimed in claim 10, wherein the memory circuitry and the computer program code are configured to, with the processing circuitry, cause the apparatus to define an angular range around the first direction and omit directions, from this angular range, from the coherence analysis to identify the second direction.

13. An apparatus as claimed in claim 10, wherein the coherence analysis comprises estimating an energy ratio for the first direction and estimating an energy ratio for the second direction.

14. An apparatus as claimed in claim 1, wherein the memory circuitry and the computer program code are configured to, with the processing circuitry, cause the apparatus to obtain at least a third audio signal, where the third audio signal is captured with the microphone array, wherein the microphone array comprises at least three microphones, wherein the first audio signal is captured with a first microphone of the microphone array, wherein the second audio signal is captured with a different second microphone of the microphone array, wherein the third audio signal is captured with a different third microphone of the microphone array.

15. An apparatus as claimed in claim 1, wherein the memory circuitry and the computer program code are configured to, with the processing circuitry, cause the apparatus to provide at least the first audio signal, the second audio signal and metadata to one or more synthesisers to enable the first audio signal, the second audio signal and the metadata to be used to synthesise a spatial audio signal, wherein the metadata comprises information indicative of the first direction and the second direction and/or information indicative of a first energy ratio associated with the first direction and a second energy ratio associated with the second direction.

16. A method comprising:

obtaining at least a first audio signal and a second audio signal, wherein the first audio signal and the second audio signal are captured with a microphone array comprising at least two microphones;

identifying, for a first plurality of frequency bands of at least the first audio signal and the second audio signal, at least a first direction; and identifying, for a second plurality of frequency bands of at least the first audio signal and the second audio signal, at least a second direction corresponding;

wherein the first direction and the second direction are identified using delay parameters between at least the first audio signal and the second audio signal, wherein the second direction is identified using information related to the first direction.

17. A method as claimed in claim 16, comprising identifying a first energy parameter and a second energy parameter, wherein the second energy parameter is identified using information related to the first energy parameter.

18. A method as claimed in claim 17, wherein at least one of the first energy parameter or the second energy parameter comprises an energy ratio.

19. A method as claimed in claim 17, wherein different frequency bands are used to identify the second direction and/or the second energy parameter than the first direction and/or the first energy parameter.

20. A method as claimed in claim 19, wherein wider frequency bands are used to identify the second direction and/or the second energy parameter than are used to identify the first direction and/or the first energy parameter.

* * * * *